F. R. EVANS.
MACHINE FOR CUTTING GAUNTLET CUFF OR OTHER BLANKS OF FABRIC, PAPER, OR OTHER MATERIAL.
APPLICATION FILED FEB. 7, 1918.
1,302,340.
Patented Apr. 29, 1919.
9 SHEETS—SHEET 4.
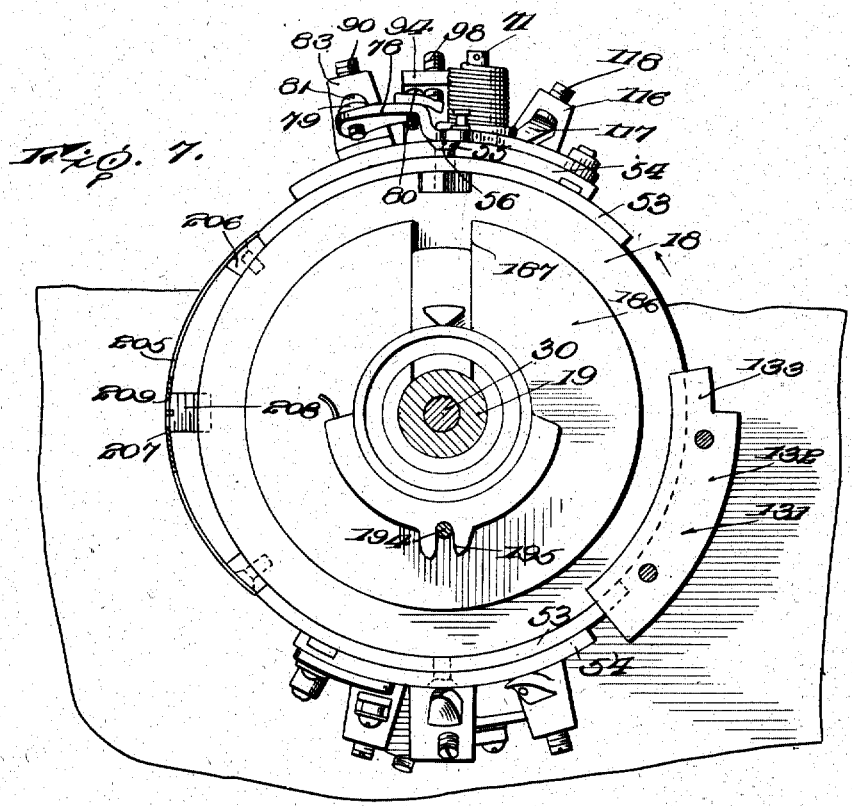
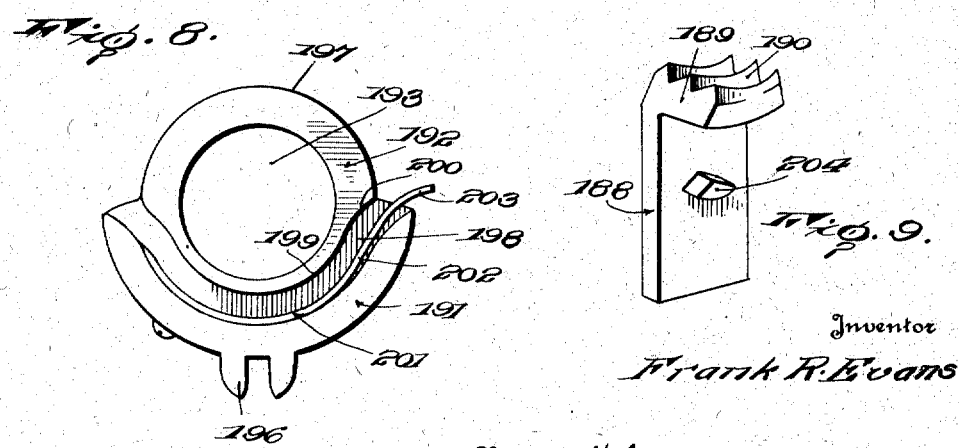
Inventor
Frank R. Evans.

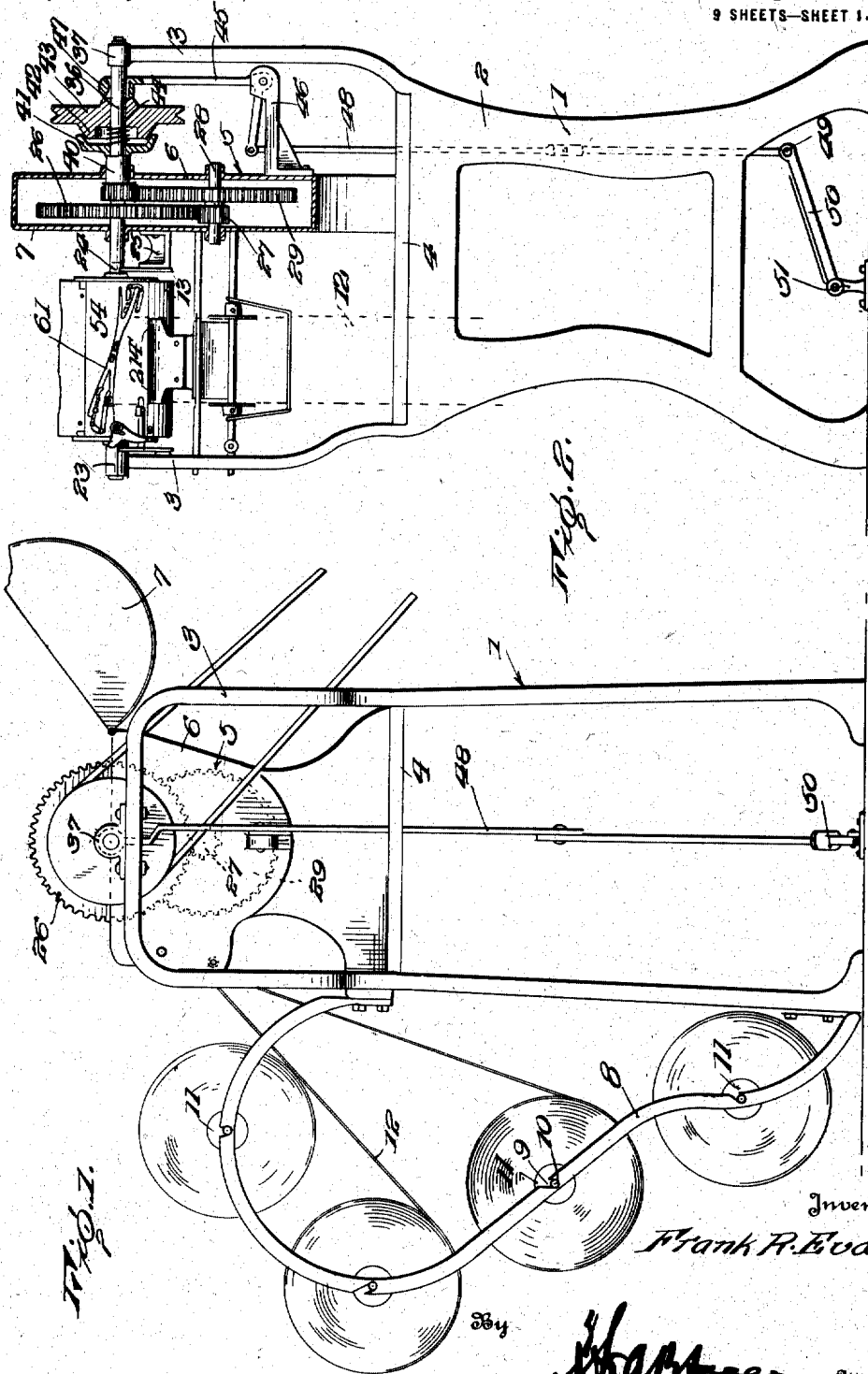

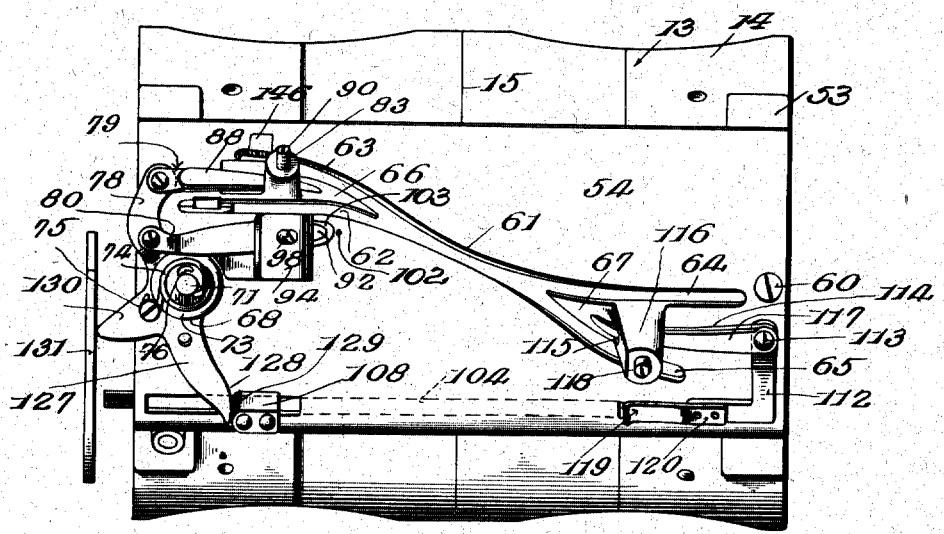

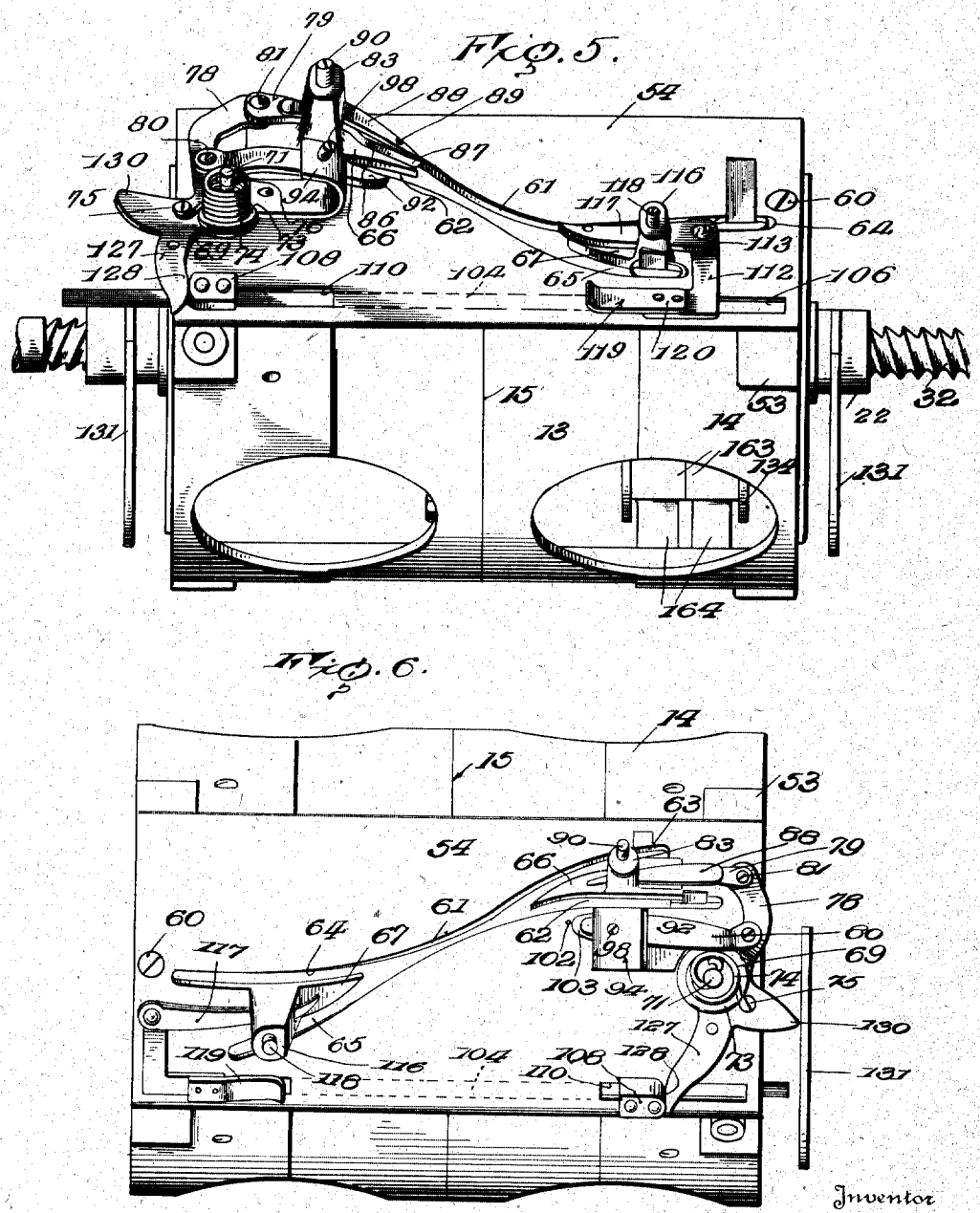

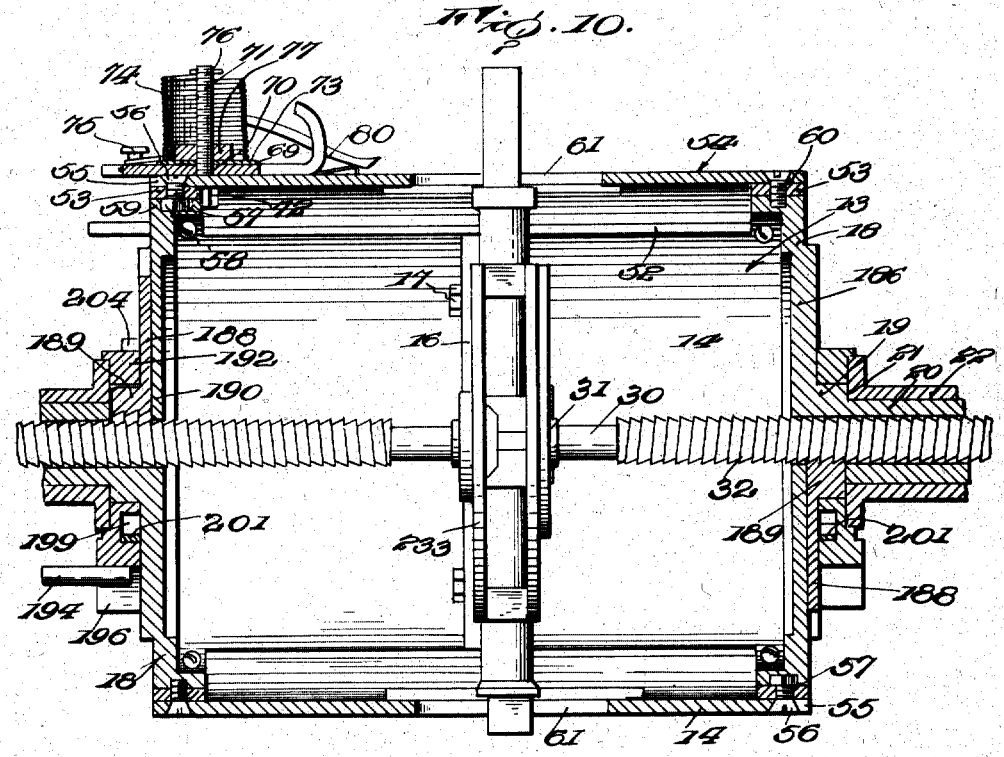
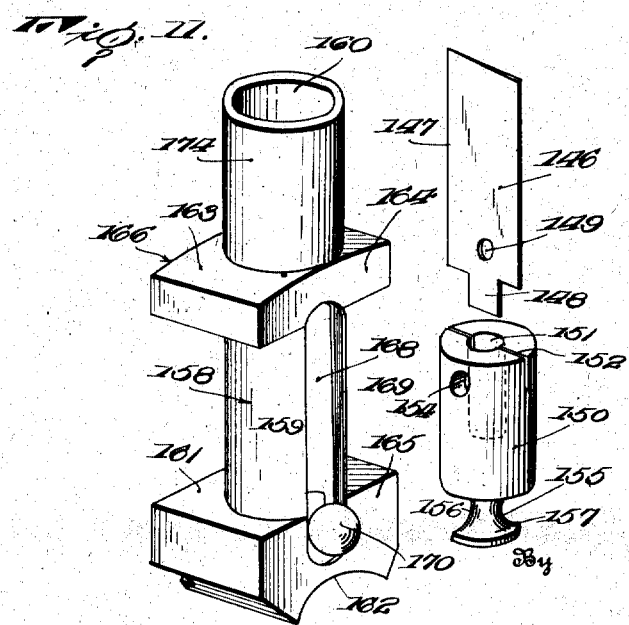
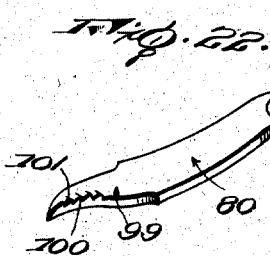

F. R. EVANS.
MACHINE FOR CUTTING GAUNTLET CUFF OR OTHER BLANKS OF FABRIC, PAPER, OR OTHER MATERIAL.
APPLICATION FILED FEB. 7, 1918.
1,302,340.
Patented Apr. 29, 1919.
9 SHEETS—SHEET 6.
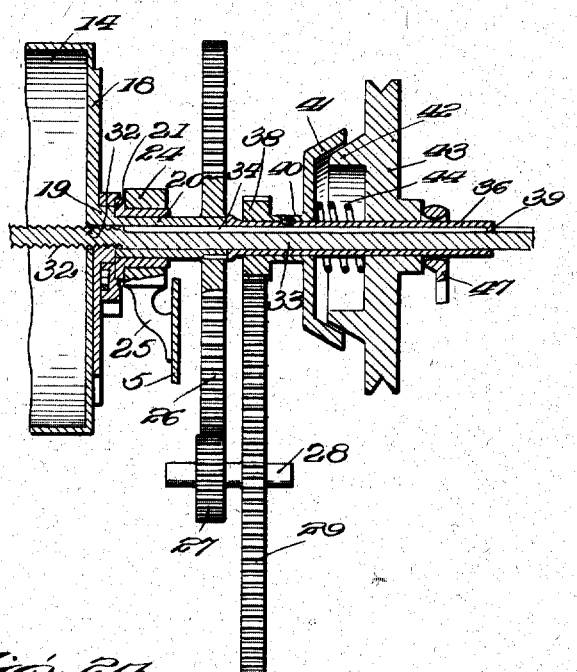
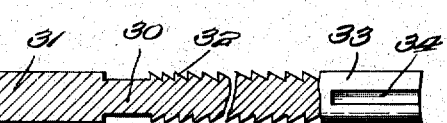
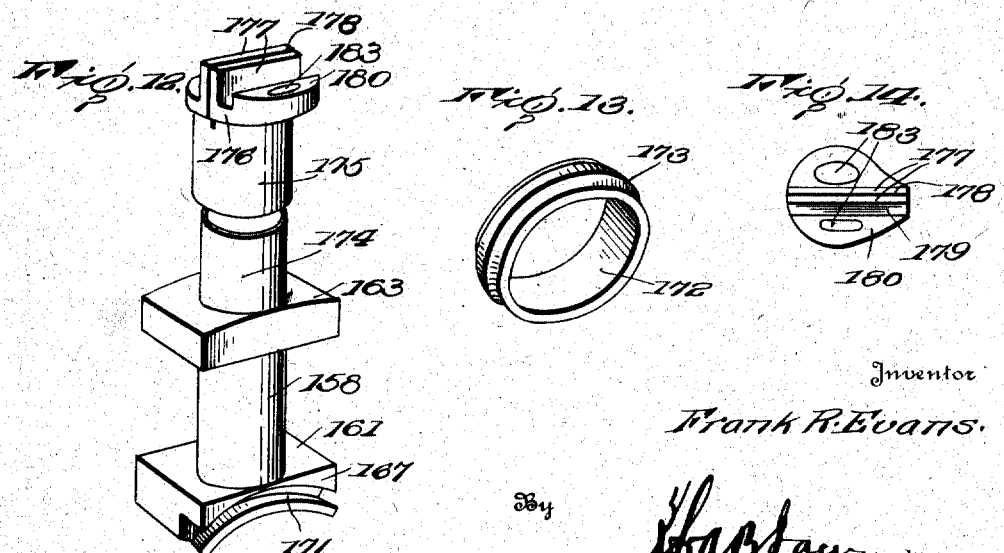
Inventor
Frank R. Evans.
By
[signature], Attorneys.

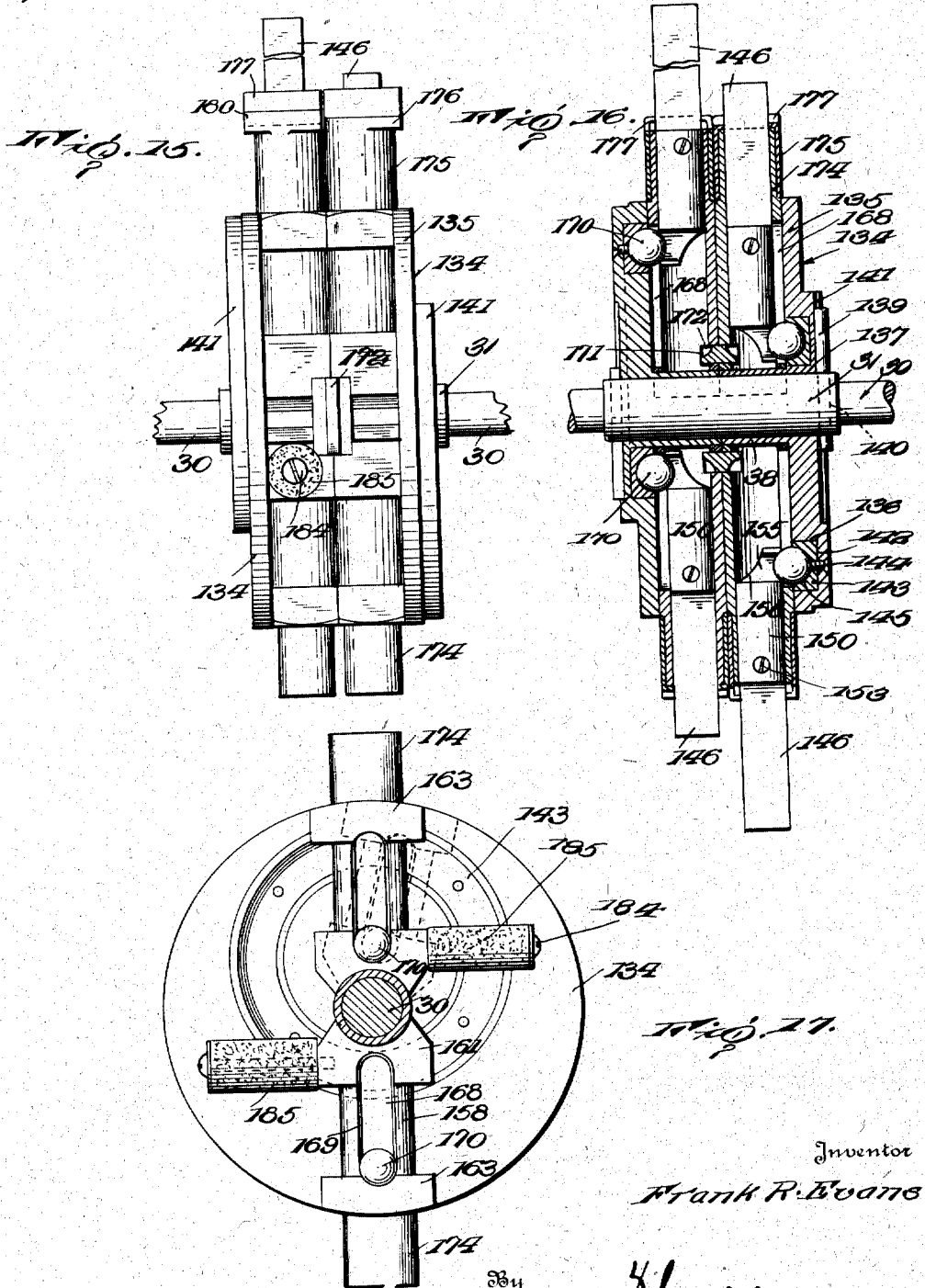

F. R. EVANS.
MACHINE FOR CUTTING GAUNTLET CUFF OR OTHER BLANKS OF FABRIC, PAPER, OR OTHER MATERIAL.
APPLICATION FILED FEB. 7, 1918.

1,302,340.

Patented Apr. 29, 1919.
9 SHEETS—SHEET 8.

Inventor
Frank R. Evans.

By
Evans, Attorneys.

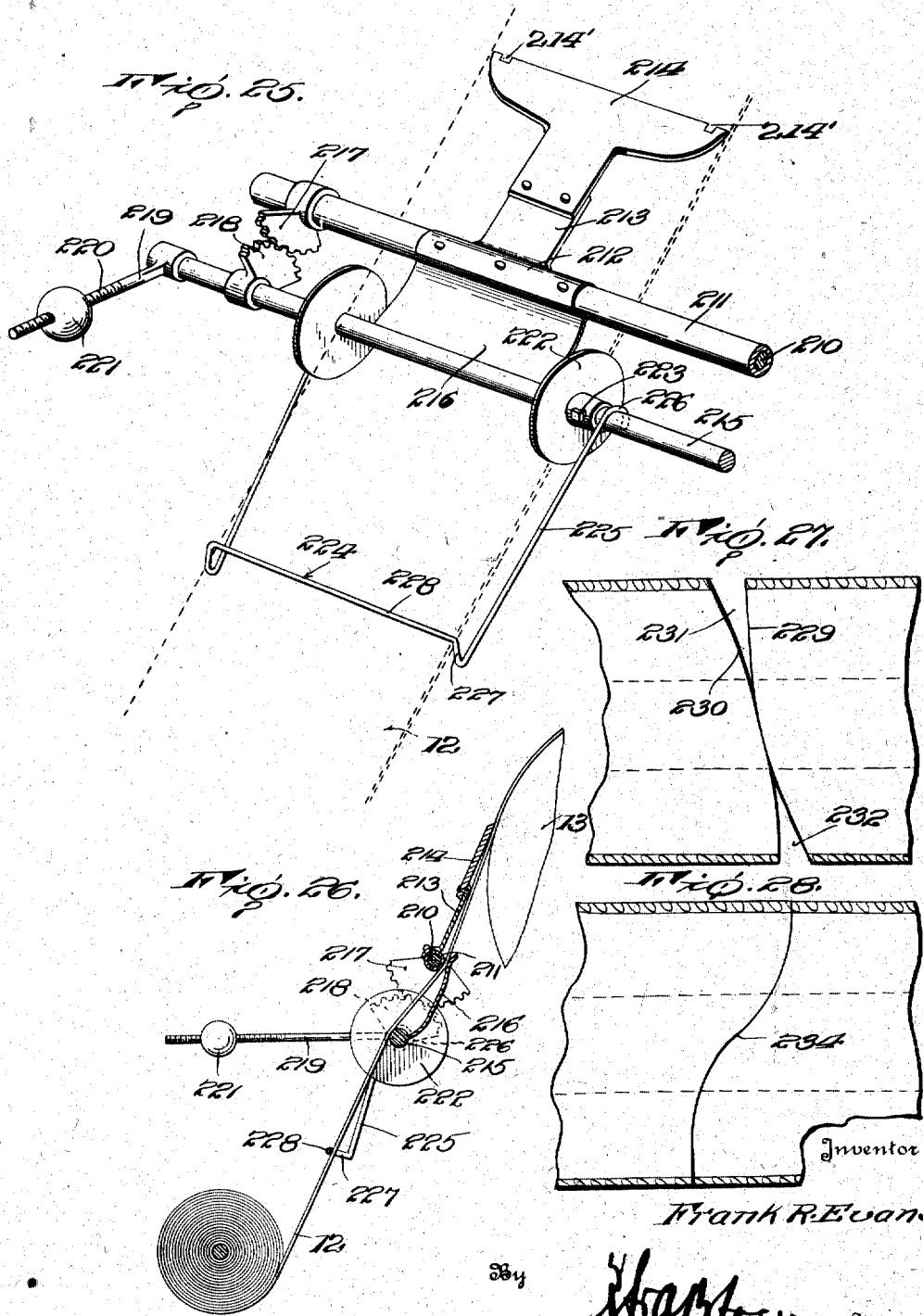

UNITED STATES PATENT OFFICE.

FRANK R. EVANS, OF ZANESVILLE, OHIO.

MACHINE FOR CUTTING GAUNTLET-CUFF OR OTHER BLANKS OF FABRIC, PAPER, OR OTHER MATERIAL.

1,302,340.  Specification of Letters Patent.  Patented Apr. 29, 1919.

Application filed February 7, 1918. Serial No. 215,814.

*To all whom it may concern:*

Be it known that I, FRANK R. EVANS, a citizen of the United States, residing at Zanesville, in the county of Muskingum and State of Ohio, have invented certain new and useful Improvements in Machines for Cutting Gauntlet-Cuff and other Blanks of Fabric, Paper, or other Material, of which the following is a specification.

This invention relates to machines for cutting apparel blanks and while the machine embodying the present invention is designed primarily for use in cutting the cuff blanks of gauntlets, it may be employed in cutting various other apparel blanks from one or more strips fed into the machine. Heretofore it has been customary to cut the blanks of gauntlet cuffs from strips or sheets of material by means of dies, the several plies to form a blank being separately cut and being subsequently stitched together to form the completed blank. This method of cutting the plies of gauntlet cuff blanks, however, possesses numerous disadvantages. Gauntlet cuff blanks are made in various shapes as concerns the contour of their end edges and they are also made in various lengths and widths. For this reason it has heretofore been necessary to provide a separate and distinct die for cutting each distinct size of blank and, of course separate and distinct dies for cutting blanks having their end edges of different shapes. As a result the cutting of gauntlet cuff blanks has heretofore been a rather expensive operation due to the numerous dies which the manufacturer is required to have on hand. Also, as above stated, the several plies which are to constitute the finished blank are separately cut from the strip or sheet of material and these plies are afterward stitched together to form the said blank. In stitching the plies to form the blanks, the assembled plies of one blank are fed through the sewing machine and are followed by the assembled plies of another blank and so on. Thus there must be a considerable gap between succeeding blanks as they are fed through the machine in the sewing operation, and these gaps are, of course, spanned by thread which is subsequently cut-away and, therefore, wasted. Furthermore, the cutting machine employs but a single die or set of dies at a time and consequently there must be a considerable waste of material which is that portion occurring between the incisions in the material defining the adjacent ends of succeeding plies of blanks. Furthermore, while a cutting machine of the type employing a die is designed to cut a number of plies or blanks at a single operation, this number is not so great, nor is the operation of the machine so rapid as to enable a great number of plies to be cut in a short period of time. In consideration of the foregoing the present invention aims to provide a machine which may be continuously operated at a relatively high rate of speed and which will automatically cut, from a rolled strip of material fed into the machine, gauntlet cuff blanks of exactly the desired size and shape, the machine being adaptable, through slight adjustment of its parts to operate upon strips of various widths and to cut cuff blanks of various lengths and having any desired end marginal contour.

The machine embodying the present invention is designed to act upon one or more strips fed into it in overlapped relation and it is another aim of the invention to so construct the machine that it will automatically cut cuff blanks from the strip or strips without any appreciable waste of material, and in any event a waste far below that attending the use of a machine employing dies for the cutting of the blanks.

In carrying out the invention it is contemplated that long strips of material suitable for the different plies which are to comprise the blank shall be stitched together so as to form a long composite strip any severed length of which will comprise the desired number of plies for the cuff, and one or more of these strips are to be fed into the cutting machine embodying the present invention and automatically cut thereby into suitable lengths forming the blanks. Thus the tedious operation of sewing together the plies after they have been cut from the strip or sheet is obviated, and as the machine is so constructed as to cut transversely through the strip in such manner as to practically wholly obviate waste of the material comprising the plies, there is likewise accomplished a saving in thread which as above stated must, in the heretofore practised methods of stitching, span the gap between succeeding blanks as the blanks are fed through the sewing machine.

The invention has a further object to so construct the machine that the same will rapidly and automatically cut cuff blanks from one or more strips prepared in the manner above described without likelihood of crushing or soiling the blanks so that they are in perfect condition for delivery to the wholesaler.

Another aim of the invention is to provide novel means for positioning and guiding the strip or strips as fed into the machine so that there will be no likelihood of the strip becoming disarranged during the cutting operation through being fed unevenly.

The machine embodying the present invention includes a rotary cylinder onto which the strip to be cut is fed, and the cutting mechanism is arranged, in the rotation of the cylinder, to act upon the strip to sever the same at proper intervals to form the blanks, and it is a further object of the invention to provide upon the cylinder novel means for automatically gripping and securely holding the strip to the cylinder as it is fed thereon.

In connection with the means above referred to the invention also has as its object to provide means for positively disengaging the severed blanks from the cylinder and depositing the same in a pile which may be removed by the operator when a sufficient number of the blanks have accumulated in the machine.

The invention further aims to so construct and arrange the gripping and holding means above referred to that the same will be adapted to grip and securely hold strips of various widths and may also be adjusted to accommodate a single strip of a single ply, a single strip comprising two or more plies, or any desired number of composite strips so that with slight adjustment the machine may be employed in cutting blanks from but a single strip or any desired number of strips.

As above pointed out the machine embodying the present invention includes a rotary cylinder onto which the strip or strips to be cut are fed, and cutting mechanism designed to operate during the rotation of the cylinder, and this cutting mechanism includes radially reciprocatory traveling knives, to which motion is automatically imparted in the operation of the machine, and it is another aim of the invention to provide novel means for guiding these knives in their travel transversely of the cylinder so that cuts made through the strip in severing the lengths which are to form the blanks, will be evenly and cleanly made and with such accuracy that the blanks will all be of a uniform size and will have their end margins of uniform contour.

The invention further aims to provide means, for guiding the knives in their travel, of such construction that the machine may be readily and quickly adapted to make incisions of various curvatures or shapes in the strip in the act of severing the strip into blank lengths. Thus while it has heretofore been necessary, as above pointed out, to have on hand a number of dies equal to the number of different shapes of cuff blanks to be cut and the number of different sizes of such blanks, the present machine is capable, with but slight adjustment, of performing the same work as the various dies and in a more efficient manner.

With regard to the knives of the machine, the invention contemplates the provision of novel means for imparting reciprocatory motion to the knives while at the same time permitting of relative angular movement of the knives so as to permit them following different paths of travel during the cutting operation.

A further aim of the invention is to provide for so mounting the knives that any knife may be readily and quickly removed for sharpening or repair and may be readily replaced in its support without the necessity of dismounting the support or in any way disassembling the parts thereof.

A further object of the invention is to provide means for so mounting the knives that they may be given reciprocatory motion in a direction radially with relation to the axis of the cylinder, may assume positions at various angles to the axis of the cylinder in following the guides which are provided for guiding them in their travel during the cutting operation, and to provide for relative angular movement of the two knives of each set so that the knives of each set may follow direct paths at the beginning and termination of the cutting operation, and as will be more specifically explained, in the description which is to follow.

The machine embodying the present invention also includes pattern plates which are removably mounted upon the cylinder and which are provided with means for guiding the knives in their travel across the cylinder during the cutting operation, and it is a further object of the invention to so construct each pattern plate that the same may be readily removed and replaced without the necessity of in any way disarranging or disassembling the parts of the cylinder itself and thus, while a pattern plate of the construction shown in the drawings and to be hereafter specifically described, is adapted for use in the cutting of cuff blanks of various lengths and widths and having various end marginal contours, other pattern plates of some special design may be substituted therefor whenever desired.

Another feature of the invention resides in the fact that the mechanism provided for gripping and holding the strip of material from which the cuff blanks are to be cut, is supported upon a respective one of the pattern plates and therefore when once adjusted is not in itself disturbed with relation to the adjustment, nor in its adjustment with relation to the knife guiding means upon the pattern plate when the pattern plate is removed from or replaced upon the cylinder.

The invention has as a further object to so mount the supporting means for the knives upon the shaft which controls the operation of the knives, that the parts comprising the said supporting means may be readily disassembled whenever desired and equally as readily reassembled.

In connection with the said supporting means for the knives, the invention aims further to provide novel means for lubricating the parts of said mechanism.

A still further object of the invention is to so construct and mount the gripping fingers of the mechanism which are designed to grip and hold the strip upon the cylinder, that the said fingers may be caused to bear more or less firmly upon the strip fed to the cylinder and, in the instance of one particular finger of this mechanism, will be provided with means for effectually preventing the strip being pulled laterally out of place after having been once engaged by the finger.

A still further aim of the invention is to provide novel means for placing the strip or strips under tension as they are fed to the cylinder so as to insure of them being properly laid in position upon the cylinder and thus effectually engaged by the elements of the cutting mechanism. The invention also has as an object the provision of means whereby the cylinder may be circumferentially expanded or contracted so that by a slight adjustment the machine may be adapted to cut cuff blanks of various lengths without, however, in any way requiring adjustment of the gripping mechanism of the cutting mechanism.

In the accompanying drawings:

Figure 1 is a side elevation of the machine embodying the present invention;

Fig. 2 is a front elevation thereof;

Fig. 3 is a front elevation of the cylinder of the machine and illustrating in detail one of the pattern plates and the gripping mechanism thereon, the parts of the mechanism being in the positions which they will occupy initially, or in other words, before being brought into engagement with the strip to be cut;

Fig. 4 is a view similar to Fig. 3 but illustrating the cylinder advanced to such position that certain of the gripping elements of the gripping mechanism have been tripped to engage one side portion of the strip;

Fig. 5 is a view similar to Fig. 3 but illustrating the cylinder farther advanced and showing the positions of the parts of the gripping mechanism when the mechanism has been completely tripped and all of the gripping elements are in the positions which they will assume when engaging or gripping the two side portions of the strip to be cut;

Fig. 6 is a view similar to Fig. 3 but looking at the reverse side of the cylinder and, consequently, viewing in elevation the other pattern plate upon the cylinder;

Fig. 7 is an end elevation of the cylinder, parts being shown in section to better illustrate the construction;

Fig. 8 is a view in side elevation in detail of the controlling cam for the feed nut which coacts with a shaft extending through the cylinder and to be presently more specifically described;

Fig. 9 is a perspective view of the feed nut removed from the machine;

Fig. 10 is a vertical longitudinal sectional view through the cylinder of the machine taken in a plane substantially at the longitudinal middles of the pattern plates;

Fig. 11 is a grouped perspective view illustrating one of the knives of the supporting means therefor;

Fig. 12 is a similar view illustrating another position of one of the parts of the knife supporting means and another element of said means;

Fig. 13 is a perspective view of a bearing ring which is disposed between the bearing members for the knives;

Fig. 14 is a plan view of the upper element shown in Fig. 12 of the drawings;

Fig. 15 is a view in elevation of the supporting means for the knives removed from the cylinder but mounted upon the supporting shaft;

Fig. 16 is a vertical longitudinal sectional view through the supporting means shown in Fig. 15;

Fig. 17 is a side elevation of the structure shown in Fig. 16, parts being omitted;

Fig. 22 is a perspective view of the fingers shown in Fig. 21;

Fig. 23 is a longitudinal sectional view illustrating the gearing for the drum and the shaft which extends through the drum;

Fig. 24 is a view partly in longitudinal section and partly in elevation of the said shaft;

Fig. 25 is a perspective view illustrating the guiding and tensioning means for the strip being fed to the cylinder;

Fig. 26 is a vertical front and rear sectional view through the structure shown in Fig. 25 and illustrating also a fragment of the cylinder and a strip of cloth passing from the roll through the said guiding and tensioning means and onto the cylinder;

Fig. 27 is a plan view of a fragment of the strip to be cut and illustrating the incisions to be made therein;

Fig. 28 is a similar view but illustrating an incision of a different shape to be made in the said strip.

Figure 19:
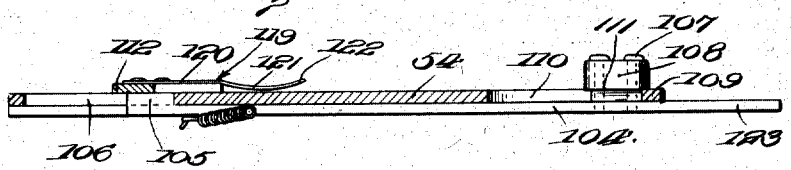
Fig. 19 is a vertical longitudinal sectional view therethrough taken substantially in a line with the trip bar.

The mechanism embodying the invention may be mounted within any suitable supporting frame structure which in the present instance is indicated in general by the numeral 1 and this supporting structure includes spaced front and rear frame members 2 suitably shaped and proportioned and connected at the opposite sides of the structure as a whole by arched members 3. A suitable base 4 is supported within the frame structure and the cylinder of the machine is located above this base in such position that as the blanks are cut from the strip or strips fed into the machine, they will be dropped flat onto the said base. In order to house certain gearing which will be presently specifically described, a gear case 5 is mounted upon the base 4 and comprises a lower fixed section 6 and a hinged upper section or cover 7. this gear casing being located to one side of the center of the said base. Fixed upon the front of the supporting frame structure 1 are spaced arcuate frame members 8 having a suitable number of bearings 9 in which are disposed the trunnions 10 of spools 11 upon which are wound the strips 12 from which the blanks are to be cut, the strips being led from the rolls onto the cylinder of the machine in a manner which will be presently fully pointed out. At this point, however, it will be understood that one or any desired number of rolls of the material may be supported at the front of the machine depending, of course, upon the number of blanks which are to be cut at each cutting operation of the machine. It will also be understood that the rolls of material may be supported in any other suitable manner if found desirable.

The cylinder of the machine is indicated in general by the numeral 13 and the same comprises a cylindrical body 14 divided circumferentially, as indicated by the numeral 15, so that the cylinder as a whole comprises right and left sections. The wall 14 of the cylinder is provided at the meeting ends of its sections with flanges or lugs 16 through which suitable bolts or other fastening devices 17 are to be passed for the purpose of securing the sections of the cylinder together in the assembled relation shown best in Figs. 3, 4, 5 and 6 of the drawings. Each section of the cylinder is provided at its outer end with a head 18 and each head is formed upon its outer face, axially with a hub portion 19 which is reduced at 20, forming a shoulder 21. Fitted onto the reduced portion 20 of the hub of each head 18 is a sleeve bushing 22 and the bushing 22 at one end of the cylinder is fitted into a suitable bearing 23 upon the adjacent arched member 3 of the frame structure and the other bushing 22 is fitted in a similar bearing 24 carried by a bracket 25 supported upon one side of the gear case 5. The reduced portion 20 of the hub upon that head of the cylinder which is located next adjacent the gear case, is extended through an opening in the adjacent wall of the said gear case, as shown in Figs. 2 and 23 of the drawings, and fixed upon the end of the said reduced portion of the hub, and housed within the gear case is a gear 26 which meshes with a small pinion 27 fixed upon a counter shaft 28 journaled at its ends in the side walls of the lower portion of the gear case, as shown in Fig. 2. A large gear 29 is also fixed upon the counter shaft 28 and is designed to transmit motion from the power shaft of the machine to the said pinion 27, gear 26, and, consequently, the cylinder 13. The power shaft above referred to is indicated in general by the numeral 30, and the same is provided intermediate its ends with a cylindrical enlarged portion 31 and at opposite sides of the portion 31 with threads 32. As will be presently explained, the knife supporting means is mounted upon the portion 31 of the power shaft 30 and feed nuts are carried by the cylinder heads and are designed to coact with the threads 32 upon the said shaft for the purpose of feeding the shaft longitudinally through the cylinder in one direction or the other to cause travel of the knives across the cylinder during the cutting operation. At that end which is located at the gear case end of the mechanism, the shaft 31 has a relatively long cylindrical extended portion 33 formed with a longitudinally extending keyway 34 and a similar cylindrical extending portion 35 is provided at the other end of the shaft. The portion 35 of the shaft rotatably and slidably fits within the hub of the cylinder which is remote from the gear case, and the portion 33 of the shaft fits rotatably and slidably through the hub of the cylinder which is located next adjacent the gear case, as clearly shown in Fig. 23 of the drawings, and in fact this latter portion of the shaft extends entirely through and a suitable distance beyond the outer side of the gear case. In order to provide a bearing for the said portion 33 of the power shaft and also to provide for the support of gear elements for rotating this shaft, a relatively long sleeve 36 is fitted onto the said portion 33 of the shaft and at its inner end bears against the outer end of the hub 20 at a point within the gear case 5, the outer end of the sleeve being rotatably journaled in a suitable bearing 37 upon the adjacent arcuate frame portion 3. A pinion 38 is fixed upon the sleeve 36 at the inner end thereof and meshes with the gear 29 and it will be understood that when rotary motion is imparted to the sleeve 36, this motion will be imparted also to the pinion 38 and will be transmitted to the gear 29, pinion 27, and gear 26 to rotate the cylinder. In order that the power shaft may be rotated also when the sleeve 36 is being rotated, the said sleeve is provided interiorly at its outer end with a lug or key 39 which engages in the keyway 34 in the portion 33 of the said shaft it being understood that the shaft may slide through the sleeve without causing disconnection of the sleeve from the shaft. The pinion 38 is preferably provided with a hub portion 40 which is fixedly connected with one member 41 of a friction clutch. The other member of this clutch indicated by the numeral 42 is located upon one face of a pulley 43, and a spring 44 is positioned to surround the sleeve 36 and to bear between the clutch members 41 and 42 so as to yieldably hold the member 42 out of engagement with the member 41. However, the pulley 43 which carries the clutch member 42 is freely rotatably mounted upon the sleeve 36 and slidable thereon so as to be moved against the tension of the spring 44, into frictional engagement with the clutch member 41 and in order that this may be accomplished, an angle lever 45 is mounted for rocking movement upon a bracket 46 either upon the gear case 5 or the supporting frame structure and at the other end of its vertical arm is provided with a yoke or collar 47 loosely surrounding the sleeve 36 and engaging the hub of the pulley 43. A rod 48 is pivotally connected to the other arm of the angle lever 45 and at its lower end is connected as at 49 to the outer end of a foot lever or treadle 50 which is supported at its inner end upon a bracket 51 either secured to the floor or arranged within the supporting frame structure. It will now be apparent that when the foot lever 50 is depressed, the angle lever 45 will be rocked so as to shift the pulley 43 and bring the clutch member 42 into engagement with the clutch member 41. As the pulley 43 is continuously driven through the medium of a suitable belt, when the said foot lever is depressed, rotary motion will be imparted at a high rate of speed to the shaft 30 and, through the reducing system of gearing, at a much lower rate of speed to the cylinder 13.

At diametrically opposite sides, the wall 14 of the cylinder 13 is formed with openings 52 and secured upon the outer face of the said wall of the drum at each end of each opening 52 is an arcuate bearing strip 53, these strips being designed to be engaged by the inner faces of the ends of the pattern plates when the said plates are assembled with the cylinder. Inasmuch as the pattern plates and the gripping mechanisms carried thereby are identical in construction except that the knife slots in the two plates extend in relatively opposite directions a description of one of the plates and the mechanisms carried thereby will suffice. The pattern plate is indicated in general by the numeral 54 and the same is of a length corresponding to the length of the body of the cylinder and is transversely curved to correspond to the curvature of the cylinder wall 14, the plate being disposed with its inner face seating against the outer faces of the arcuate bearing strips 53 as clearly shown in Figs. 3, 7 and 10 of the drawings, and the plate covering the respective opening 52 in the cylinder wall 14. In order to provide for quick and ready application and detachment of the pattern plate 54, the said plate is formed in one end edge with a notch 55, the side walls of which are beveled to engage beneath the conical head 56 of a screw or bolt 57 permanently fixed through one of the strips 53 and into the cylinder wall, the bolt in the present instance being secured by a threaded engagement in a nut 58 fitted into a recess 59 formed in the cylinder wall at one end of the opening 52 and retained in place by means of the associated bearing strip 53. Thus the said end of the pattern plate may be readily slid into and out of engagement with the head of the screw 56 and when in engagement with the same will be securely held to the surface of the cylinder. The pattern plate 54 is secured in place at its other end, however, by means of a bolt or screw 60 which is fitted through the said end of the plate, through the arcuate bearing strip 53, and into the wall of the cylinder. It will now be apparent that so long as the screw 60 is in place, displacement of the pattern plate is positively prevented although the plate may be readily removed by first removing the screw 60 and then sliding the plate out of engagement with the screw 57. As before indicated the pattern plate 54 is formed with a slot to provide for travel of the knives during the cutting operation and this slot is indicated in general by the numeral 61, its intermediate portion extending substantially diagonally of the lid portion of the pattern plate and, consequently, obliquely to the longitudinal axis of the plate as shown in Figs. 3, 4, 5 and 6 of the drawings. At each end the main portion of the slot 61 terminates in diverging branches and the branches at one end of the slot are indicated one by the numeral 62 and the other by the numeral 63. The branches at the other end of the slot are indicated one by the numeral 64 and the other by the numeral 65. By reference to the drawings it will be observed that the branches 63 and 65 are of less length than the respective branches 62 and 64. The branches 62 and 63 and the branches 64 and 65 relatively diverge in the direction of the respectively adjacent ends of the cylinder and it will be apparent that, taken in connection with the main portion of the slot 61, the branches 62 and 64 and the branches 63 and 65 of the said slot extend along the lines of intersecting cyma curves. It will also be observed that between the branches 62 and 63 a portion of the plate 54 is left intact, as indicated by the numeral 66, and that between the branches 64 and 65 there is provided a similar portion 67, the portions 66 and 67 serving to support the guides for certain of the gripping fingers to be presently described. As before stated the slots in the two pattern plates are curved in relatively opposite directions, as will be apparent by comparison of Figs. 3 and 6 of the drawings so that the incision made in the strip of material by the knives working through one pattern plate will extend along a line curved in one direction and the incision made by the knives working through the other pattern plate will extend along the line curved in the opposite direction so that as a result the severed blank will have its end edges oppositely curved. Before proceeding to a description of the operation of the knives, the mechanism which is provided for gripping the strip of material to be cut and holding the same to the cylinder during the cutting operation will first be specifically described. This mechanism in general comprises three gripping fingers and a presser finger, two of the gripping fingers being arranged at one end of the pattern plate and the third gripping finger and the presser finger being located at the other end of the pattern plate. Of the two first-mentioned gripping fingers, one is designed to work over the portion 66 of the pattern plate and, consequently, between the branches 62 and 63 of the slot 61, and the other over the said pattern plate rearwardly of the branch 62. In like manner the third gripping finger is designed to work over the portion 67 of the pattern plate, or in other words, between the branches 64 and 65 of the said slot, and the presser finger is designed to work over the plate to the rear of the branch 65. To provide for movement of the first-mentioned fingers into and out of active position there is provided a trip member which is indicated in general by the numeral 68. This trip member includes a head 69 which is mounted upon the outer face of the pattern plate 54 at that end of the said plate at which the branches 62 and 63 of the slot 61 are located, the said head being fitted for swiveling movement as at 70, to the inner end portion of a threaded pin 71 which is provided at its inner extremity with a head 72, the said pin being threaded through the pattern plate 54 and projecting beyond the outer face of the said plate. It is preferable that a thin washer 73 be fitted to the pin 71 in position resting against the outer face of the head 69, and a coiled tension spring 74 is disposed to surround the pin 71 with its inner coils resting against the washer 73 and its inner end connected to a stud 75 fixed upon the head 69. The outer end of this spring is secured, as at 76, through the outer end of the pin 71. It will now be understood that the spring 74 tends to turn the head 69 upon the pin 71 toward the right in Fig. 3 of the drawings, and it will also be apparent that the tension of the spring may be varied by adjusting the pin 71 through the rotation of the head 72, the pin being held at adjustment by means of a set nut 77 threaded upon the pin and bearing against the washer 73, the pin being further held against backward rotation by providing the head 72 with a flattened face 72' which rests against the adjacent end wall of the respective opening 52, as shown in Fig. 10. An arm 78 extends in a general forward direction from the head 69 of the member 68 and has pivotally connected to it the inner ends of the gripping fingers which are located at this end of the cylinder and which fingers are indicated in general one by the numeral 79 and the other by the numeral 80. A pivot screw 81 pivotally connects the inner end of the gripping finger 79 to the outer end of the arm 78 of the trip member 68 and this finger extends over the portion 66 of the pattern plate 54 and works through a slot 82 formed in a guide post 83 carried by an attaching plate 84 which is secured by means of screws 85 or other suitable fastening elements, to the outer face of the said portion 66 of the pattern plate. Near its forward end the finger 79 is inwardly offset as at 86 in the direction of the said portion 66 of the pattern plate and the under side of its engaging end is rounded or beveled to form a nose 87 which is designed to ride over the edge portion of the strip or strips to be cut by the machine. In order to provide means for causing the engaging end of the gripping finger 79 to bear firmly upon the said edge portion of the strip and thus hold the same firmly against the cylinder during the cutting operation a leaf spring 88 is secured at one end as at 89 to the upper side of the said finger 79 at the forward end of the latter and extends inwardly above the said finger with its inner end resting upon the upper side of the finger near the pivot 81, the intermediate portion of the spring 88 being, however, upwardly bulged to a sufficient extent to space the spring above the upper side of the finger. A tension screw 90 is adjustably threaded through the upper end of the post 88 and bears at its inner end against the bowed intermediate portion of the spring 88, and it will be understood that in this manner the spring may be placed under a greater or less degree of tension so as to cause the engaging end of the finger 79 to more or less firmly bear upon the edge portion of the strip or strips to be cut. It will also be understood that by adjusting the tension screw 90, the finger may be adapted to ride over a single strip of material or over several of the strips fed to the machine in superposed relation, the beveled or rounded nose portion 87 permitting the said end of the finger to readily ride over the edge of the strip or strips. It will also be understood that when the trip member 68 is rocked upon its pivot against the tension of the spring 74 the finger 79 will be retracted through the outward swinging movement of the arm 78, but that when the trip member is released and is rotated through the influence of this spring the inward swinging movement of the arm 78 will cause the gripping finger 79 to move through the guide 88 over the portion 66 of the pattern plate and in the direction of the extremity of the said portion.

Figures 20, 21:
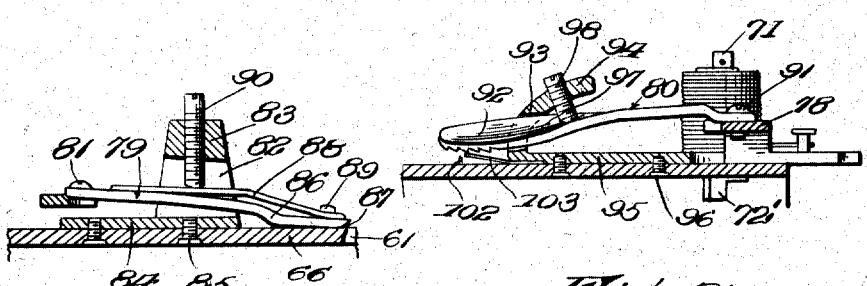
Fig. 20 is a vertical sectional view through the support and guide for one of the gripping fingers, the said fingers being illustrated in elevation.
Fig. 21 is a similar view illustrating another one of the gripping fingers.

The gripping finger 80 is pivotally connected to the arm 78 by means of a pivot screw 91 at a point near the juncture of the arm with the head of the trip member 68, and this finger has its gripping portion relatively broad, as shown in Figs. 3, 21 and 22 of the drawings, its said portion, indicated by the numeral 92 being slightly canted with relation to the shank of the said finger. The engaging portion 92 of the finger 80 works through a slot 93 formed in the outwardly curved portion 94 of a die plate 95 which is secured by screws or other suitable fastening elements 96 to the outer face of the pattern plate. By canting the engaging portion of the finger with relation to the shank, an inclined cam surface 97 is provided at the upper side of the said finger and engaging this surface is the inner end of a tension screw 98 which is adjustably threaded through the portion 94 of the guide plate. The cam surface 97 is of such contour that when the finger 80 is retracted through the outward swinging movement of the arm 78 of the trip member 68, the inner end of the tensioning screw 98 will engage the lower portion of the cam surface 97, but on the other hand when the arm 78 is swung inwardly upon release of the trip member 68, the cam surface 97 will be caused to so ride against the inner end of the tensioning screw 98 as to bring the higher portion of the surface into engagement with the said end of the screw, thus depressing the gripping end of the finger as the finger is moved inwardly toward the middle of the cylinder. Therefore, as the finger 80 is moved in the manner last stated its gripping portion will be lowered into engagement with the strip of material to be cut and, of course, the degree of pressure which is exerted by the finger against the material may be varied by adjusting the tensioning screw 98. In canting the engaging portion 92 of the finger 80 with relation to the shank of the said finger this portion is so positioned that one edge portion thereof will constitute the engaging surface and along this edge portion, indicated by the numeral 99, the said finger is formed with a series of gripping teeth 100, which teeth have inclined faces presented in the direction of movement of the finger toward gripping engagement and abrupt faces 101 presented in the opposite direction. As a result the teeth 100 may readily ride over the material to be cut and securely grip the same, but the material cannot be displaced laterally upon the cylinder as the abrupt faces 101 of the teeth effectually prevent withdrawal of the material from beneath the engaging portion of the finger.

In order to further insure against displacement of the strip upon the cylinder even after the incision has been made through the strip during the cutting operation and prior to release of the cuff blank from the cylinder, a needle point 102 is provided upon the outer face of the pattern plate in the path of movement of the gripping portion of the finger 80 but is so located as to be spaced rearwardly from the edge portion 79 of the said finger so that due to the inclination or canting of the gripping portion of the finger, the said portion will not strike the needle point 102, but will on the other hand be suitably spaced from the surface of the pattern plate to escape the said point. It will be understood, of course, that as the finger 80 is moved inwardly toward gripping position and rides over the edge portion of the strip of material to be cut, the strip will be forced down over the needle point 102 and will be punctured by the said point and firmly anchored to the pattern plate. Thus the needle point assists the gripping teeth 100 in preventing displacement of the strip of material upon the cylinder. In order to automatically disengage the strip of material from the needle point 102 at the time the gripping finger 80 is retracted in the act of releasing the cut blank from the cylinder, a disengaging leaf spring 103 is fixed at one end upon the outer face of the pattern plate and is inclined outwardly from the surface of the said plate with its free end located in close proximity to the needle point 102. Thus when the material is forced down over the needle point 102, the outer end of the spring 103 will be depressed against the inherent resiliency of the said spring, but when the finger 80 is retracted the said end of the spring will, in resuming its outwardly sprung position, force the material off from the said needle point. As before stated the gripping finger 79 is movable over the portion 66 of the pattern plate and the finger 80 is movable over the surface of the pattern plate immediately rearwardly of the branch 62 of the slot 61 so that the material is gripped at its portion which extends over the portion 66 of the pattern plate, or in other words, between the branches 62 and 63 of the said slot 61 and is also gripped at its portion which lies immediately rearwardly of the said branch 62.

Before proceeding to a description of the means provided for tripping the plate 68 to cause projection and retraction of the gripping fingers 79 and 80, I will first describe the third gripping finger heretofore referred to and the presser finger. The numeral 104 indicates a trip bar which is slidably mounted upon the inner face of the pattern plate 54 at the rear edge thereof, or in other words at that edge opposite the edge which is presented in the direction of rotation of the cylinder in the operation of the machine. At one end, which may be termed its inner end, the trip bar 104 is formed or provided with a lug 105 which slidably engages in a slot 106 formed longitudinally in the said pattern plate parallel to the said edge thereof. The bar 104 has riveted or otherwise secured to it, as indicated by the numeral 107, an abutment block 108 the purpose of which will be presently explained, this block having its inner portion reduced, as indicated by the numeral 109, to work slidably in a slot 110 also formed in the pattern plate and located in alinement with the slot 106. By the engagement of the lug 105 in the slot 106, and the reduced portion of the abutment block 108 in the slot 110, the bar 104 is slidably connected to the pattern plate for movement longitudinally thereof and, consequently, longitudinally of the cylinder. In reducing the abutment block 108, a shoulder 111 is formed which engages the outer face of the pattern plate and the opposite sides of the slot 110 so as to hold this end of the trip bar against separation from the plate, and one end of an arm 112 is riveted or otherwise secured to the outer face of the lug 105 and rests against the outer face of the pattern plate to similarly hold the other end of the trip bar against separation from the said pattern plate. The arm 112 extends forwardly along the outer face of the pattern plate and has pivotally connected to it, as at 113, one end of the third gripping finger above mentioned, this finger being indicated by the numeral 114. The said finger 114 works through a guide slot 115 formed in a guide post 116 secured upon the outer face of the portion 67 of the pattern plate and, therefore, the finger is arranged to move over the said portion 67 in the same manner that the finger 79 moves over the portion 66 of the said pattern plate. A tension leaf spring 117 is arranged upon the outer side of the finger 114 and is slightly bowed as in the case of the tension spring 88, and a tension screw 118 is adjustably threaded through the outer end of the guide post 116 and bears at its inner end against the outer face of the said tension spring 117. It will now be understood that when the trip bar 104 is slid outwardly, the finger 114 will be retracted, but that on the other hand when the bar is slid in the opposite direction the finger 114 will be moved inwardly, or in other words projected along the portion 67 into engagement with the adjacent portion of a strip of material passing over the said portion of the pattern plate. The presser finger heretofore referred to is indicated in general by the numeral 119 and comprises a leaf spring 120 which is secured at one end to the outer face of the arm 112 and which, as clearly shown in Fig. 19 of the drawings, has its free portion bowed downwardly as at 121 so as to exert pressure against the outer face of the pattern plate, the extremity of the said portion of the spring being, however, turned upwardly, as indicated by the numeral 122 so as to adapt the engaging portion of the spring to ride over the edge of the strip of material to be held in place upon the cylinder. Inasmuch as the gripping finger 114 works over the portion 67 of the pattern plate, it is designed, of course, to grip that portion of the strip of material extending between the branches 64 and 65 of the slot 61, and the presser finger 119 is designed to engage the said strip of material rearwardly of the branch 65. For a purpose to be presently explained, that end of the bar 104 at which the abutment block 108 is located projects beyond the corresponding end of the pattern plate, as indicated by the numeral 123, and the bar is normally held in the position shown in Figs. 18 and 19 of the drawings, by means of a coil spring 124 which is connected at one end, as at 125, to the said bar 104 near that end of the bar at which the lug 105 is located, and at its other end as at 126 to the inner face of the pattern plate 54.

Consequently, movement of the bar in a direction to project the gripping and presser fingers 114 and 119 into engagement with the work, is accomplished through the pull exerted by the said spring 124, and movement of the trip bar in the direction to retract the fingers is against the tension of the said spring. In a like manner the spring 74, when the trip member 68 is tripped or released, so rotates this member as to project the gripping fingers 79 and 80 into engagement with the work and the opposite movement of the member in retracting the fingers is against the tension of the said spring 74. In order that the movements of the several gripping fingers and the presser finger into and out of active position may be properly timed and performed automatically, means is provided which will now be described. The head 69 of the trip member 68 is provided with a wiper finger 127 which has a cam edge 128 designed to ride against a rounded face 129 of the abutment block 108 and thus the trip member 68 and trip bar 104 are so connected that when the trip member 68 is rocked in a direction to retract the gripping fingers 79 and 80, the wiper finger 127 will ride against the abutment block 108 in a manner to cause the trip bar 104 to be moved against the tension of the spring 124 to retract the fingers 114 and 119. To provide for automatic movement of the trip member 68 in the manner stated and for a timed release of this member, a trip finger 130 is provided upon the head 69 of the said trip member 68 and extends beyond the adjacent end of the drum and moves in a path to coact with a trip plate 131, as shown in Fig. 3 of the drawings. As heretofore stated the two pattern plates upon the cylinder have their slots relatively reversed and, consequently, the gripping fingers upon the two plates are relatively reversed as regards their positions at the ends of the plates so that the trip finger 130 of the trip member 68 upon one pattern plate will coact with the trip plate 131 at one end of the cylinder and a second one of the trip plates will be provided at the other end of the cylinder for the coaction therewith of the trip finger 130 upon the trip member 68 upon the other pattern plate. The trip plates 131 may be mounted upon any convenient portion of the frame of the machine, and in Fig. 2 of the drawings one of the plates is illustrated as mounted upon one of the portions 3 of the supporting frame structure and the other plate is mounted upon the bracket 25. Each plate is, however, substantially of arcuate form and each has a surface portion 132 located in the path of travel of the end of the trip finger 130 of the respective trip member 68, and a surface portion 133 which is longer than the surface portion 132 and extends beyond the upper end of the said portion 132 and is located in the path of travel of the projecting end 123 of the trip bar 104. By comparison now of Figs. 3, 4 and 5 of the drawings it will be understood that as the cylinder of the machine is rotated in the operation of the machine, the trip finger 130 of one of the pattern plates will be brought into engagement with the surface portion 132 of the respective trip plate 131 and thus the trip member 68 will be rocked upon its pivot so as to swing the arm 78 outwardly thereby retracting the gripping fingers 79 and 80. In such movement of the trip member 68, the wiper finger 127 will ride against the abutment block 108 in a manner to move the trip bar 104 against the tension of the spring 124 and in a direction to retract the fingers 114 and 119. Thus at such time all of the fingers are in position to permit of the strip of material being laid onto the cylinder in proper position to have its edge portions engaged by the fingers when tripped. As the rotation of the cylinder is continued, the trip finger 130 will ride past the end of the surface portion 132 of the trip plate 131 and thus the spring 74 will be permitted to act to immediately trip the member 68, rocking the same upon its pivot so as to quickly project the fingers 79 and 80 into gripping engagement with the adjacent edge portion of the strip of material. The trip bar 104, however, is not at this time released but its projecting end 123 remains in engagement with the surface portion 133 of the respective trip plate 131. However, as this end of the trip bar rides past the end of the trip plate, the bar will be immediately shifted through the action of the spring 124, and the fingers 114 and 119 will be projected into engagement with the other edge of the strip of material. In the meantime the cutting mechanism has been set in operation as will be presently fully described and the strip during the continued rotation of the cylinder is severed transversely. At this point it may be remarked that even though the strip is cut transversely as stated, the end of the strip is not released from the cylinder but is securely held through the engagement therewith of the trip finger 80 and the presser finger 119.

Figure 18:
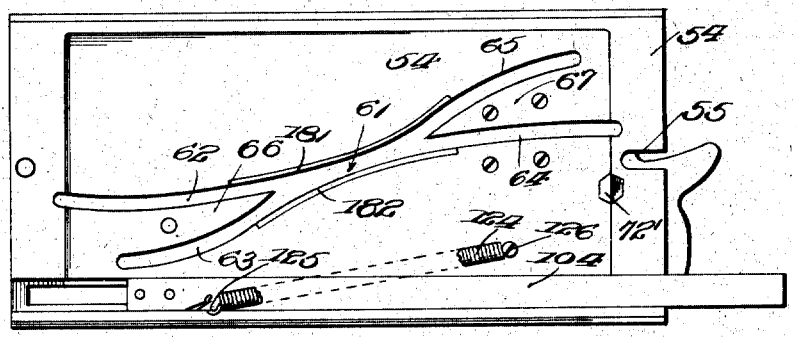
Fig. 18 is a bottom plan view of one of the pattern plates removed from the cylinder.

The means provided for supporting and actuating the knives of the cutting mechanism is mounted upon the portion 31 of the power shaft 30, as clearly shown in Figs. 15 and 16 of the drawings. In the arrangement shown in Figs. 15, 16 and 17, the cutting mechanism includes two pairs or sets of knives and actuating mechanism therefor, the knives being designed to cut the strip in the manner shown in Fig. 27 of the drawings. However, as will be presently explained, each set may be replaced by a single knife to produce the cut shown in Fig. 28 of the drawings, which arrangement of the knives is clearly shown in Fig. 10 of the drawings. In the arrangement shown in the first mentioned figures, two cheek plates, indicated in general by the numeral 134 are fixed upon the portion 31 of the shaft 30 and each of these cheek plates comprise a circular disk 135 which upon its outer face is formed with an eccentrically located thickened portion 136. An opening 137 is formed axially through each cheek plate and each plate is provided upon its inner face with a sleeve-like hub portion 138, the bore of which constitutes an extension of the opening 137. As is clearly shown in Fig. 16 of the drawings the cheek plates are disposed opposite to each other upon the portion 31 of the shaft with their hubs 138 fitting the said portion of the shaft and abutting at their inner ends, and the plates are secured in this position by means of pins or keys 139 which are driven through openings 140 in the said portion of the shaft and seat in radial channels 141 formed in the outer face of the said cheek plates. By reference to Figs. 15 and 16 it will be observed that the plates are reversely disposed upon the shaft, or in other words, are so relatively arranged that their thickened eccentrically located portions 136 will extend at diametrically opposite sides of the shaft. Each plate 134 is formed in its inner face, eccentrically to the axis of the plate as a whole but concentric to the thickened portion 136, with an annular groove 142 in which is disposed a ring 143 removably secured in place by means of screws or other fastening elements 144 and formed in its inwardly presented face with a ball race 145. The screws 144 are preferably four in number and are located 90° apart so that when one of the races becomes worn at one side or portion, it may be removed by removing the screws 144, rotated approximately a quarter turn and then again secured in place so as to present a new wearing surface to the balls which work in the race 145 and through which motion is transmitted to the supporting heads for the knife blades, as will be presently described. Each knife comprises a blade 146 which is relatively thin and which has a sharp straight cutting edge 147 and the blade is provided at its inner end with a tang 148 and inwardly of the tang is formed with an opening 149. The blade is supported by means of a head 150 which is exteriorly cylindrical in form and which in one end is formed with a cylindrical socket or bore 151 axially located, and with a slot or kerf 152 which extends diametrically of the said end of the head and, consequently, transects the socket 151. In fitting the blade 146 to its respective head 150, the inner end of the blade is fitted into the slot or kerf 152 and the tang 148 of the blade seats in the inner end of the socket 151. Due to the engagement of the tang of the blade in the inner end of the socket 151, the blade is held against tilting or displacement in the direction of its cutting edge or its back, and due to the engagement of the inner end of the body of the blade in the kerf or slot 152, the blade is effectually braced and held against turning in the head. In order to secure the blade in place, a screw or other suitable fastening element 153 is secured through an opening 154 formed in one side of the head 150 and communicating with the socket 151, and through the opening 149 in the blade 146. It will now be apparent that while the blade is in this manner firmly and securely anchored to its respective head 150, nevertheless the blade may be readily removed by removing the fastening element 153. For a purpose to be presently explained, the head 150 at its inner end is formed with a neck, indicated in general by the numeral 155 and at one side, this neck is cut-away, as indicated by the numeral 156, in such manner that at a point approximately midway between its ends, the said neck 155 is slightly less than a semi-circle in extent, the neck being formed in its outer side with a ball race 157 which, in the assembled relation of the parts, opposes the ball race 145 in the respective cheek plate 134. As above stated the knife head 150 is cylindrical, and the said head is rotatably and slidably supported within a knife race of the construction clearly shown in Figs. 11 and 12 of the drawings, this race being indicated in general by the numeral 158. The race 158 is in the nature of a hollow cylindrical body 159, the cylindrical bore of which is indicated by the numeral 160. At its inner end this body is formed or provided with a saddle block 161, the inner face of which is concave, as indicated by the numeral 162, so as to snugly fit and ride upon the hub 138 of the respective one of the cheek plates 134, in the assembled relation of the parts. The saddle block 161 is approximately of rectangular form and by reference to Figs. 15 and 16 of the drawings it will be apparent that in assembling the parts of the cutting mechanism, the blocks of each pair or set are disposed between the cheek plates 134 with the inner faces of the said blocks in mutual contact, these faces being smoothly finished so as to reduce friction between the parts, it being understood that the races 158 may have independent angular movement upon the hubs of the cheek plates. To further steady the races of each set, the body 159 of each race is formed intermediate its ends with a head 163 which is approximately rectangular and which has a flat face 164 which is designed to work against the inner face of the respective or adjacent cheek plate 134 and which occupies the same plane as the outer face of the saddle block 161, which face is indicated by the numeral 165, and also works against the inner face of the said respective cheek plate 134. The opposite face of the head 133, indicated by the numeral 166, contacts the corresponding face of the companion race 158 and occupies the same plane as the above mentioned inner side face of the said block 161 and which inner side face is indicated by the numeral 167. As clearly shown in Figs. 11 and 16 of the drawings the body 159 is formed in its side at which the faces 164 and 165 of the head 163 and block 161, respectively, are located, with a slot 168 which extends longitudinally of the said body and between the said head and block, and the walls of this slot are inclined inwardly toward each other, as indicated by the numeral 169, so as to provide a ball race of a width less than the diameter of bearing balls 170 which are disposed in the said race and which seat also in the race 145 in the respective cheek plate 134. As clearly illustrated in Fig. 16 of the drawings the balls 170 also seat in the races 157 formed in the necks 155 of the respective knife heads and inasmuch as the race 145 is eccentric to the shaft 30, as this shaft is rotated, and the knife races 158 are held against rotation with the cheek plates 134 the balls 170 will be caused to travel back and forth in the races 169 thus carrying with them the knife heads 150 and in this manner imparting reciprocatory motion to the blades 146. In order to hold the knife races against radial displacement with relation to the shaft 31 and with their saddle blocks 161 seating properly upon the hubs of the respective cheek plates 134, the saddle block 161 of each race is formed with an arcuate groove 171 and when the knife races of each set are assembled as shown in Fig. 16, these grooves 171 register with each other so as to provide an annular channel receiving the locking rings shown in Fig. 13 of the drawings. This ring indicated by the numeral 172 is interiorly cylindrical and, to lessen friction is exteriorly formed at opposite sides of its middle with bevels or grooves 171. It will be understood that when the companion knife races have been assembled in the manner shown in Fig. 16, with the side portions of the locking ring 172 seating in the grooves 171, the said knife races will be effectually locked against radial displacement and yet may have independent angular movement about the hubs of the respective cheek plates 134. In order that the knives may be guided in their travel in the slots 61 and the branches thereof, in the pattern plates, and also to provide means for guiding and reinforcing the blades in their reciprocatory motion, each brace 158 has fitted to its end which extends beyond the head 163 and which is indicated by the numeral 174, a thimble indicated in general by the numeral 175. This thimble comprises a hollow cylindrical body open at one end to adapt it to be rotatably fitted upon the said projecting end 174 of the body of the knife race and closed at its other end. The closed end of the thimble, indicated by the numeral 176, is provided with outstanding guide lips 177 which are slightly spaced by the formation of a slot 178 which slot communicates with the interior of the body of the thimble and is sufficiently wide to permit the knife blade 146 to pass readily back and forth therein, in the reciprocatory motion of the said blade. The said end 176 of the thimble is formed with a guideway or groove 179 which extends at the outer side of one of the lips 177. This guideway or groove 179 may be formed by cutting into the closed end 176 of the thimble 175, or the said closed end of the thimble may be formed with a boss as in the present instance indicated by the numeral 180 and spaced from the lips 177. By reference now to Fig. 18 of the drawings it will be observed that the inner face of the pattern plate 54 is formed at opposite sides of the slot 61 with guide flanges 181 and 182, the flange 181 extending at the side of the slot 61 and to a short distance, at its ends, beside the branches 62 and 65 of the said slot, and that the guide flange 182 extends along the other side of the slot 61 and at its ends for a short distance beside the branch slots 63 and 64. It will now be evident that when the parts are properly assembled and the knives of one set are in an intermediate position with relation to the cylinder, the guide flange 181 will seat within the guideway or groove 179 in the thimble for one knife and the guide flange 182 will seat in the said guideway or groove in the thimble for the other knife and that as the knives are caused to travel across the cylinder, they will be guided into the respective branch slots, the knife which has its thimble associated with the guide flange 181 being directed in its movement in one direction into the branch slot 62 and in its movement in the opposite direction into the branch slot 65 and the other knife which has its thimble associated with the guide flange 182, being directed in its movement in one direction into the branch slot 63 and in its movement in the opposite direction into the branch slot 64. Of course, the engagement of the guide flanges 181 and 182 in the guideways of the thimbles of the respective knives will serve to hold the thimbles against rotation upon the respective knife races and inasmuch as the respective knives fit through the slots 178 they will likewise be held against rotation with respect to their races although the thimbles and knives will, of course, be partly rotated in their travel across the cylinder in following the curvatures of the main slot and branch slots. It will be understood, of course, that the guide flanges 181 and 182 constitute means for directing the knives into the proper branch slots as they leave the main slot 61, and that after the knives have once entered their respective branch slots, they will be held against rotation, or in other words, will be guided without further assistance such as afforded by the said guide flanges, and hence the flanges need extend at their ends only a short distance beside the respective branch slots, as shown in Fig. 18. While as stated the engagement of the guide flanges 181 and 182 in the guideways of the knife thimbles prevents free rotation of these thimbles and, consequently, free rotation of the knives and their heads in their respective races, nevertheless upon removal of one of the pattern plates, the associated thimbles may be readily removed from the projecting ends of the knife races and the knives may then be rotated within their races so as to present the cut-away sides 156 of their necks 155 to the balls 170, thus permitting of the knife heads being slipped out from their respective races for sharpening of the blades or repair thereof. As before stated the slot 168 in the body of each knife race is of a width less than the diameter of the ball 170 which works in the respective race 169 and, consequently, even though the knife head be removed from the knife race, the ball will be retained in its proper position and, therefore, it is an easy matter to reinsert the head into the knife race and rotate the same so as to again cause coöperation of the ball race 157 of the neck 155 with the said ball, whereupon the head will be locked against accidental withdrawal from the knife race and at the same time will be caused to reciprocate when the respective cheek plate 134 is rotated. In the rotation of the shaft 30, which, of course, imparts rotary motion to the two cheek plates 134, the knives of each set will be alternately moved outwardly and inwardly due to the opposite or reverse arrangement of the eccentrically located race rings 143. Thus during the cutting operation, while one knife of a set is moving inwardly and cutting through the strip of material, the other knife is moving outwardly and is cutting through the strip. It will also be understood at this point that the knives follow one another in their movement across the cylinder so that, for example, the knife which works through the branch slot 63 will enter the main slot 61 before the knife which works through the branch slot 62, the first-mentioned knife in a like manner entering the branch slot 64 before the second mentioned knives enter the branch slot 65. However, upon reverse travel of the knives, which, of course, after the proper incisions have been made in the strip of material, the order of travel will be reversed, the second-mentioned knife leaving the branch slot 65 and entering the main slot 61 before the first-mentioned knife leaves the branch slot 64 and enters the main slot. In cutting through the material small particles of lint will naturally accumulate upon the knives and as the knives are drawn inwardly and passed through the slot 178 this lint will be wiped off by the outer edges of the lips 177, and in order to collect this lint and prevent accumulation of the same between relatively moving parts which would be likely to clog the machine, and also to provide for discharge of the accumulated lint as the knives are carried under by the rotation of the cylinder, are openings 183, it being understood that the particles of lint will drop through these openings into the respective thimbles while the knives are being carried over by the cylinder and during the cutting operation but will be dropped through the said openings as the knives are being carried under by the cylinder.

In order to supply lubricant automatically to the inner faces of the cheek plates 134 in the operation of the machine, relatively long screws 184 are fitted at their inner ends into an end face of each of the saddle blocks 161 and each of these screws rotatably supports a small sleeve or roll 185 of felt or other suitable material saturated with a lubricant. By reference to Fig. 15 of the drawings it will be observed that the rolls travel with their peripheries in contact with the inner face of cheek plates, thus supplying lubricant to the plates and to the balls 170 and ball races 145.

I will now describe the means which I have provided for longitudinally feeding the shaft 30 so as to cause the knives to travel across the cylinder during the cutting operation. As before stated the shaft 30 is formed at the opposite sides of its portion 31 with screw threads 32 and it is preferable that these threads take the form clearly shown in Fig. 24 of the drawings, the threads having their sides which are presented toward the central portion of the shaft, perpendicular to the axis of the shaft and their other sides beveled or inclined as is customary. I prefer to form the threads in this manner in order that the perpendicular sides of the threads may receive the strain which is imposed upon the threads and also to provide for more efficient coaction with the threaded portions of the shaft, of feed nuts which are provided upon the heads of the cylinder. Each cylinder head 18 is provided upon its outer face with a thickened portion 186 and the heads formed in this portion with a guideway 187 for the respective nut. By reference to Fig.

10 of the drawings it will be apparent that the guideways upon the two heads are located at diametrically opposite sides of the axis of the cylinder and means is provided for so automatically shifting the feed nuts above mentioned that during the rotation of the drum through one half of a complete revolution one feed nut will be idle and the other feed nut will be held in coactive relation to the shaft so as to feed the shaft longitudinally in one direction, the first-mentioned feed nut being rendered inactive and the second mentioned nut active to feed the nut in the opposite direction while the cylinder is rotating through the remaining half of its revolution. One of the feed nuts employed is clearly illustrated in Fig. 9 of the drawings and the same comprises a plate 188 which is slidably disposed in the respective guideway 187 and which is provided at its inner end upon its outer face with a head 189 having a concave inner side formed with teeth or short threads 190 for coaction with the threads 32 at the respective end of the shaft 30. It will now be understood that when the nut 188 is moved outwardly in the guideway 187, the threads 190 upon its head 189 will be out of engagement with the threads 32 upon the shaft 30, but that when the said nut is moved inwardly in the guideway, or in other words, toward the axis of the shaft, the threads 190 will be brought into mesh with the threads 32. In order that this shifting of the nut 188 may be automatically accomplished in the operation of the machine, there is provided a cam member clearly shown in Figs. 7 and 8 of the drawings and indicated in general by the numeral 191. This cam member comprises a body 192 which is approximately annular in form and is provided with an opening 193 designed to rotatably receive the hub portion 19 of the respective cylinder head 18, the cam member being engaged by the inner end of the bushing 22 and thus held in place against the face of the cylinder head, and being held against rotation by the engagement of a pin 194 in a notch 195 formed between fingers 196 located at its lower side. The pin 194 projects from any suitable fixed portion of the frame of the machine. The upper portion of the body 192 of the cam member provides a cam surface 197 concentric to the axis of the opening 193 and, consequently, concentric to the axis of the cylinder. In its inner face the body of the cam member is formed with an arcuate groove 198, the upper wall of which extends between the ends of the cam surface 197 and is indicated by the numeral 199. The intermediate portion of the wall 199 constitutes a cam surface concentric to the axis of the opening 193 but located nearer the axis of the opening than the cam portion 197, and the end portions of the cam surface 199 are reversely curved as indicated by the numeral 200. For a purpose to be presently explained a leaf spring 201 is secured at one end within the lower portion of the groove 198 and extends within the groove, and adjacent its other end portion diverges from the lower wall of the groove 198, as indicated by the numeral 202, its extremity projecting beyond the adjacent end of the groove and being reversely curved, as indicated at 203. Formed upon the outer face of the plate 188 of the feed nut is a segmental projection 204 which is designed to coact with the cam surfaces 197 and 199. In Fig. 7 of the drawings, the projection 204 is illustrated as riding upon the cam surface 197 and in such relative position to the parts the threaded head of the feed nut will be out of mesh with the threads 32 upon the shaft 30. However, the nut is carried around with the cylinder and in the rotation of the cylinder the projection will travel over the surface 197 until it engages the projecting end 203 of the spring 201, whereupon it will be guided into the corresponding end of the groove 198 and will then move successively over the cam surfaces 200 and 199. As the projection moves over the cam surface 200 the nut 188 will be moved inwardly toward the axis of the cylinder and will have its threaded head brought into mesh with the threads of the shaft 30 and the nut will engage the said shaft while the projection is traveling through the groove, but will, of course, be shifted out of engagement with the shaft as the projection 204 leaves the other end of the groove and again starts to travel over the cam surface 197. It will be understood at this point that as the free end portion of the spring 201 is normally out of contact with the lower wall of the groove 198, the said portion of the spring may yield in a downward direction as the projection 204 comes into engagement with its end 203, thereby absorbing the shock of the impact and also preventing injury to the coacting parts. As heretofore stated, the machine embodying the present invention is capable of adjustment to cut cuff blanks of various lengths and in order that this may be accomplished, means is provided whereby the circumference of the cylinder may be increased or diminished. This means comprises expansion plates 205 which are mounted upon diametrically opposite sides of the cylinder and between the pattern plates, each plate 205 being preferably of thin material so as to possess a sufficient degree of flexibility and being secured in place by means of suitable securing elements which are passed through the ends of bars 206 which extend transversely of the inner face of the plate 205 at the end edges thereof, the said fastening elements being secured in the wall of the cylinder. At its middle the plate 205 is formed with an opening 207 and adjustably threaded into the wall of the cylinder is an adjusting screw 208 having a reduced end 209 which rotatably fits within the opening 207. As will be apparent by reference to Fig. 7 of the drawings the expansion plate 205 is arcuate in form and is curved approximately to a degree corresponding to the curvature of the wall of the cylinder. However, the plate has a tendency to flatten and, consequently, when the screw 208 has been rotated to fit into the wall of the cylinder, the expansion plate 205 will follow at its intermediate portion the said screw so as to conform approximately to the cylindrical contour of the cylinder. However, when it is desired to increase the circumference of the cylinder the screw 208 is unthreaded to a greater or less extent from its socket in the cylinder, thus bulging the plate 205 outwardly, as shown in Fig. 7 to secure the desired result.

In order that the strip or strips of material heretofore referred to and indicated by the numeral 12 may be tensioned as it is laid onto the cylinder in the operation of the machine, and may be properly guided and positioned, there is provided at the front of the cylinder of the machine, a tensioning and guiding means which will now be described. The numeral 210 indicates a rod which is mounted at its ends in fixed portions of the frame of the machine and upon this rod there is mounted for oscillatory movement a sleeve 211. Fixed to the sleeve at a point directly in front of the intermediate portion of the cylinder is a plate 212 having an extension 213 provided with a relatively broad head 214, the edge of which is designed to lie against the strip of material in the manner clearly shown in Figs. 25 and 26 of the drawings, the head 214 being so positioned as to hold the strip of material firmly against the forward side of the cylinder. An oscillatory rod 215 is mounted below and slightly forwardly of the rod 210, and fixed upon this rod is an upwardly curved tongue 216, the upper edge portion of which is located directly opposite the sleeve 211 and is designed to engage one side of the strip of material and hold the same firmly to the sleeve 211. Segmental gears 217 and 218 are fixed respectively upon the sleeve 211 and rod 215 and mesh with each other, and also fixed upon the rod 215 at one end thereof is an arm 219 which extends radially from the rod and is formed with threads 220. A ball weight 221 has a threaded opening to fit the threaded rod, and the said weight adjustably fitted onto the rod tends to rotate the shaft 215 in anti-clockwise direction in Fig. 26 of the drawings, thus holding the tongue 216 in firm engagement with the strip of material passing between it and the sleeve 211 and at the same time so rocking the sleeve 211 as to cause the head 214 to firmly hold the strip of material against the cylinder. Circular heads 222 are slidably adjustably fitted onto the rod 215 and may be held at positions of adjustment by means of set screws 223 threaded through the hub portions thereof and bearing against the rod, and these heads are to be so adjusted upon the rod 215 as to engage the opposite edges of the strip of material as it passes the rod and thus guides the material. In order to further guide the material, there is provided a guide frame 224 comprising spaced side portions 225 which at their inner ends are bent to hook form as at 226 to engage over the rod 215 at the outer sides of the heads 222. The side members 225 near their opposite ends are bent upwardly at an angle as at 227, and connected by a connecting portion 228. By reference to Figs. 25 and 26 of the drawings it will be observed that the strip of material passes between the side members 225 of the guide frame and beneath the connecting portion 228 thereof with its edges engaging the upwardly bent portions 227 of the said side members.

The operation of the machine is as follows: Assuming that the gripping elements are in the positions shown in Fig. 3 of the drawings, and that a strip of material to be cut into lengths has been led over the cylinder, and the machine has been set in operation so as to impart rotary motion to the cylinder the cylinder will in its rotation pass to the position shown in Fig. 4 of the drawings, in which position the trip finger 130 has left the trip plate 131 thus releasing the trip member 68 and permitting the gripping fingers 79 and 80 to be projected through the rotation of the trip member under the influence of the springs 74. As the fingers are thrust inwardly, they will ride over the adjacent edge portion of the strip and will bind the same to the surface of the pattern plate 54, the material being punctured by the needle point 102 heretofore described, and the spring 103 being depressed by the material. In the meantime, and as soon as the trip finger 130 has disengaged from the trip plate 131, the projection 204 upon the feed nut at the opposite or right hand end of the cylinder has been brought, by the cam member 191, into mesh with the related threaded portion of the power shaft and the longitudinal movement of the shaft will cause the knives to travel from the position shown in Fig. 3 of the drawings, toward the opposite end of the cylinder, the knives being rapidly reciprocated through the rapid rotation of the power shaft as will be readily understood. Thus one of the knives will make an incision in the gripped edge portion of the strip of material which lies above the branch slot 63 and the other knife of the set will make an incision in the said strip of material along the line of the branch slot 62. As the cylinder continues to be slowly rotated the projecting end 123 of the trip bar 104 will move out of engagement with the trip plate 131 as shown in Fig. 5 of the drawings, whereupon the bar will be shifted through the influence of the spring 124 so as to project the gripping finger 114 and presser finger 119 into engagement with the other edge portion of the strip. In the continued rotation of the cylinder and during the time the feed nut above mentioned is in mesh with the threaded portion of the power shaft, the knives will continue to travel across the cylinder and will pass into the respective branch slots 64 and 65, thus making incisions in the strip in the portion thereof which extends over these branch slots. By reference to Fig. 27 of the drawings, it will be understood that one of the knives, namely, the one traveling in the branch slots 63 and 64 will make an incision extending along the line indicated by the numeral 229 in Fig. 27 of the drawings, and that the other knife will make an incision along the line indicated by the numeral 230 in the said figure and thus line 229 will define one end edge of one cuff blank and line 230 will define one end edge of another cuff blank. Between the lines there will be small portions of waste material, indicated by the numerals 231 and 232, the piece of waste material 231 being that portion of the strip which extended over the portion 66 of the pattern plate and which was gripped by the finger 79, and the waste portion 232 of the strip being that portion which was extended over the portion 67 of the pattern plate and which was gripped by the finger 114. Disregarding now the use of material lying at the right hand side of the line 229 in Fig. 27, it will be evident that the strip of material immediately at the left of the line 230 in the said figure will, even after the cutting operation, be firmly held to the cylinder by the gripping finger 80, the needle point 102, and the presser finger 119, being only released when the trip finger 130 has again been brought into engagement with the trip plate 131 and the fingers are retracted. In the meantime, however, the other pattern plate will have been brought into the position occupied by the plate shown in Fig. 3 of the drawings and as clearly illustrated in Fig. 6, and the other set of knives will be brought into operation to cut reverse incisions in the strip.

As before stated a single one of the knives may be substituted for each of the sets illustrated and described above and in making this substitution, as illustrated in Fig. 10 of the drawings, one knife of each set will be removed together with its race as will also the corresponding cheek plate, and a plate 233 will be substituted for the said cheek plate. With the machine thus modified, during the cutting operation an incision following the line indicated by the numeral 234 in Fig. 28 of the drawings will be made in the strip by the single knife operating upon the strip and in accomplishing this result the single knife may be caused to travel in the main slot and the branches 63 and 64 or in the main slot and the branches 62 and 65, or a pattern plate may be substituted for the plates shown in Figs. 3 and 6 of the drawings and having a knife slot therein of any desired curvature.

It is preferable that the engaging edge of the member 214 be provided with notches 214' located in the path of travel of the needle points 102 so that as the cylinder of the machine is rotated and passes the edge of the said member 214, the material to be cut into blanks will be effectually forced down over the needle points and yet these points will not be dulled because of the presence of the member 214, inasmuch as the notches 214' are provided in the edge of the said member.

Having thus described the invention, what is claimed as new is:

1. In a machine of the class described, a moving work support, means upon the support for coaction with the surface thereof to grip the work, a cutting element, means for imparting motion to the support, means for actuating the cutting element, and means for moving the cutting element across the support.

2. In a machine of the class described, a rotary cylinder, means upon the cylinder for coaction with the surface thereof to grip the work, a cutting element movable across the cylinder to act upon the gripped work, means for rotating the cylinder, means for actuating the cutting element, and means for moving the cutting element across the support while the work is gripped.

3. In a machine of the class described, a rotary cylinder, means upon the cylinder for gripping the opposite edges of work supplied to the cylinder, means for automatically actuating the gripping means, a cutting element, means for rotating the cylinder, means for actuating the cutting element, and means for moving the cutting element across the cylinder while the work is held by the said gripping means.

4. In a machine of the class described, a rotary cylinder, a cutting element movable across the cylinder, means for rotating the cylinder, means for actuating the cutting element to move the same across the cylinder, work gripping means upon the cylinder, and means for rendering the work gripping means active prior to actuation of the cutting element and for rendering it inactive subsequent to the action of the cutting element.

5. In a machine of the class described, a rotary cylinder, means for rotating the cylinder, work gripping means upon the cylinder, a cutting element movable across the cylinder, means for automatically moving the cutting element across the cylinder during a period in the rotation of the cylinder, and means for automatically rendering the work gripping means active to grip the work prior to movement of the cutting element and for rendering the said work gripping means inactive subsequent to actuation of the cutting element.

6. In a machine of the class described, a rotary cylinder, means for rotating the cylinder, means upon the cylinder for gripping the opposite edges of work supplied to the cylinder, means for automatically moving the cutting element across the cylinder during a period in the rotation of the cylinder, and means for automatically rendering the work gripping means active to grip the work prior to movement of the cutting element and for rendering the said work gripping means inactive subsequent to actuation of the cutting element.

7. In a machine of the class described, a rotary cylinder having a knife slot in its wall, a knife movable in said slot, means for actuating the knife, and means upon the cylinder for automatically gripping the opposite edges of a piece of work supplied to the cylinder, at points at opposite sides of said slot.

8. In a machine of the class described, a rotary cylinder having a knife slot in its wall, a knife movable in said slot, means for actuating the knife in the rotation of the cylinder, gripping elements arranged at opposite sides of the slot to engage a piece of work fed to the cylinder, and means for automatically rendering said gripping elements active prior to actuation of the knife.

9. In a machine of the class described, a rotary cylinder having a knife slot in its wall, a knife arranged for travel in said slot, means for automatically actuating the knife in the rotation of the cylinder, a work gripping element at each end of the slot for coaction with the surface of the support to grip the opposite edges of a piece of work fed to the cylinder and extending across the slot, and means for automatically rendering the said gripping elements active prior to actuation of the knife.

10. In a machine of the class described, a rotary cylinder having a knife slot in its wall, a knife arranged for travel in said slot, means for automatically imparting motion to the knife during a period in the rotation of the cylinder, and automatically operating means for gripping the work to the cylinder prior to actuation of the knife and for releasing the work subsequent to complete actuation of the knife.

11. In a machine of the class described, a rotary cylinder having a knife slot in its wall, means for rotating the cylinder, a knife arranged for travel in the slot, means for automatically actuating the knife during a period in the rotation of the cylinder, means at the opposite ends of the slot for gripping the opposite edges of a strip of work fed to the cylinder, and means for automatically rendering the gripping means active prior to the actuation of the knife actuating means and for rendering the gripping means inactive after the knife has passed through the work.

12. In a machine of the class described, a rotary cylinder, means for rotating the cylinder, the said cylinder having a knife slot extending across its wall, gripping elements upon the cylinder at the opposite sides of the said slot at each end thereof, a knife arranged for travel in said slot and to act upon a strip of material engaged by the said gripping elements, means for automatically actuating the said knife during a period of rotation of the cylinder, and means for automatically rendering the gripping elements active to grip the work at the beginning of said period and for rendering the said elements inactive at the end of the period.

13. In a machine of the class described, a rotary cylinder, means for rotating the cylinder, the cylinder having a knife slot extending across its wall and terminating at each end in diverging branches, knives arranged for travel in said slot and each in respective branches thereof, means for automatically actuating the knife during a period in the rotation of the cylinder, a gripping element arranged between the branches of the slot at each end of the said slot, and means for automatically rendering the gripping element active to grip the work fed to the cylinder at the beginning of the period of actuation of the said knives.

14. In a machine of the class described, a rotary cylinder, means for rotating the cylinder, the cylinder having a knife slot extending across its wall and terminating at each end in diverging branches, knives arranged for travel in said slot and each in respective branches thereof, means for automatically actuating the knife during a period in the rotation of the cylinder, a gripping element arranged between the branches of the slot at each end of the said slot, and means for automatically rendering the gripping element active to grip the work fed to the cylinder at the beginning of the period of actuation of the said knives, and for rendering the said gripping elements inactive subsequent to termination of the said period.

15. In a machine of the class described, a rotary cylinder, means for rotating the cylinder, the cylinder being provided in its wall with a transversely extending knife slot terminating at each end in diverging branches, a gripping element arranged for coaction with the wall of the cylinder between the branches at each end of the said slot, a gripping element arranged for coaction with the wall of the cylinder rearwardly of the slot, knives arranged for travel across the cylinder in said slot and the branches thereof, means for automatically actuating the knives during a period of rotation of the cylinder, and means for automatically moving the gripping elements into active position at the beginning of said period and for subsequently moving said elements out of active position.

16. In a machine of the class described, a rotary cylinder, means for rotating the said cylinder, the cylinder being provided with circumferentially spaced reversely extending knife slots, a knife arranged for travel across the cylinder in each of said slots, means for automatically alternately advancing the knives across the cylinder and returning the same, work gripping means upon the cylinder in juxtaposition to each of the said knife slots, and means for successively rendering the gripping means active and inactive.

17. In a machine of the class described, a rotary cylinder, means for rotating the cylinder, the cylinder being formed in its wall with circumferentially spaced reversely extending knife slots, a knife arranged for travel across the cylinder in one of said slots, a knife arranged for travel across the cylinder in the other one of said slots, means for automatically simultaneously moving the knives across the cylinder in their respective slots alternately in opposite directions during subsequent periods of rotation of the cylinder, the cutting edges of the knives being presented in opposite directions, and work gripping means upon the cylinder.

18. In a machine of the class described, a rotary cylinder, means for rotating the cylinder, the cylinder being formed in its wall with circumferentially spaced reversely extending knife slots, a knife arranged for travel across the cylinder in one of said slots, a knife arranged for travel across the cylinder in the other one of said slots, means for automatically simultaneously moving the knives across the cylinder in their respective slots alternately in opposite directions during subsequent periods of rotation of the cylinder, the cutting edges of the knives being presented in opposite directions, work gripping elements carried by the cylinder and located each adjacent a respective one of the slots, and means for automatically rendering each gripping element active prior to the commencement of the cutting travel of the knife in the respective slot.

19. In a machine of the class described, a rotary cylinder, means for rotating the cylinder, the cylinder being formed in its wall with circumferentially spaced reversely extending knife slots, a knife arranged for travel across the cylinder in one of said slots, a knife arranged for travel across the cylinder in the other one of said slots, means for automatically simultaneously moving the knives across the cylinder in their respective slots alternately in opposite directions during subsequent periods of rotation of the cylinder, the cutting edges of the knives being presented in opposite directions, work gripping elements carried by the cylinder and located each adjacent a respective one of the slots, and means for automatically rendering each gripping element active prior to the commencement of the cutting travel of the knife in the respective slot and for automatically rendering each of said gripping elements inactive subsequent to completion of the cutting travel of the knife in the respective slot.

20. In a machine of the class described, a work support, a cutting element mounted for movement across the support, means for actuating the cutting element, and means upon the support for gripping work to be acted upon by the said cutting element, the said means including a trip member, a gripping finger connected thereto, and a guide for the finger coacting with the finger to guide the same toward the said support as the finger is moved by actuation of the trip member, into active position, and means for automatically actuating the trip member in timed relation to the actuation of the cutting element.

21. In a machine of the class described, a work support, a cutting element mounted for travel across the support, means for actuating the cutting element, and means upon the support for gripping work to be acted upon by the said cutting element, the said means including a trip member, a gripping finger pivoted thereto, a guide for the said finger, and adjustable means upon the guide for forcing the finger in the direction of the support as the finger is moved in the guide into active position, and means for automatically actuating the trip member to advance and retract the finger in timed relation to the actuation of the cutting element.

22. In a machine of the class described, a work support, a cutting element mounted for travel across the support, means for actuating the cutting element, and means upon the support for gripping the work to be acted upon by the said cutting element, the said gripping means including a gripping finger, means for automatically moving the finger into and out of active position in timed relation to the actuation of the cutting element, a guide for the finger, the said finger having an inclined surface presented away from the support, and an adjustable tensioning screw upon the guide engaging the said surface of the finger.

23. In a machine of the class described, a work support, a cutting element mounted for travel across the support, means for actuating the cutting element, and means upon the support for gripping the work to be acted upon by the cutting element, the said gripping means including a gripping finger, means for automatically moving the finger into and out of active position in timed relation to the actuation of the cutting element, a yieldable bearing element upon the said finger, and an adjustable tensioning screw bearing against the said bearing element and coacting therewith to yieldably force the finger in the direction of the support when the finger is moved into active position.

24. In a machine of the class described, a work support, a cutting element mounted for travel across the support, means for actuating the said cutting element, and gripping means upon the support for gripping work to be acted upon by the said cutting element, the said gripping means including a gripping finger, means for automatically moving the gripping finger into and out of active position in timed relation to the actuation of the cutting element, and teeth upon the engaging face of the finger having inclined sides presented in the direction of movement of the finger into active position and abrupt sides presented in the opposite direction.

25. In a machine of the class described, a work support, a cutting element mounted for movement across the work support, means for actuating the said cutting element, and means upon the support for gripping the work to be acted upon by the cutting element, the said gripping means including an actuating member automatically operated in timed relation to the actuation of the cutting element, a gripping finger having a shank pivotally connected with the said actuating member and having its engaging portion canted with relation to the shank whereby to present an edge of said engaging portion toward the supporting surface of the work support, the canting of the said finger providing a cam surface, and an adjustable tensioning screw engaging the said surface and providing means for directing the gripping portion of the finger toward the surface of the work support as the finger is moved into active position.

26. In a machine of the class described, a work support, a cutting element mounted for movement across the work support, means for actuating the said cutting element, and means upon the support for gripping the work to be acted upon by the cutting element, the said gripping means including an actuating member automatically operated in timed relation to the actuation of the cutting element, a gripping finger having a shank pivotally connected with the said actuating member and having its engaging portion canted with relation to the shank whereby to present an edge of said engaging portion toward the supporting surface of the work support, the canting of the said finger providing a cam surface, and an adjustable tensioning screw engaging the said surface and providing means for directing the gripping portion of the finger toward the surface of the work support as the finger is moved into active position, the said edge of the said finger being formed with gripping teeth having their engaging points presented toward the surface of the work support and inclined in the direction of movement of the finger out of active position.

27. In a machine of the class described, a work support, a cutting element movable across the work support, means for actuating the said cutting element, and means upon the support for gripping work to be acted upon by the said cutting element, the said gripping means including a gripping finger, means for automatically moving the finger into and out of active position in timed relation to the actuation of the cutting element, and means for yieldably exerting pressure against the finger in the direction of the surface of the work support.

28. In a machine of the class described, a work support, a cutting element mounted for travel across the support, means for actuating the cutting element, a gripping element movable into and out of position to grip the work to be acted upon by the said cutting element, and means for automatically actuating the said gripping element in timed relation to the actuation of the cutting element, the said means including a trip member to which the element is connected, means tending to move the trip member in a direction to cause movement of the gripping member into active position, and a trip plate arranged in the path of movement of an element of the said trip member for moving the trip member in a direction to move the gripping member out of active position.

29. In a machine of the class described, a work support, a cutting element mounted for travel across the support, means for actuating the cutting element, a gripping element movable into and out of position to grip the work to be acted upon by the said cutting element, and means for automatically actuating the said gripping element in timed relation to the actuation of the cutting element, the said means including a trip member mounted for oscillatory movement and to which the said gripping element is connected, means tending to oscillate the trip member in a direction to project the said gripping element into active position, and means for coaction with the trip member to oscillate the same against the tension of the last-mentioned means.

30. In a machine of the class described, a work support, a cutting element mounted for travel across the support, means for actuating the cutting element, a gripping element movable into and out of position to grip the work to be acted upon by the said cutting element, and means for automatically actuating the said gripping element in timed relation to the actuation of the cutting element, the said means including an oscillatory trip member to which the gripping element is connected, a pin about which the trip member is to oscillate, means for rotatably adjusting the pin, a tension spring connected to the pin and to the said member and tending to oscillate the member in a direction to move the gripping element into active position, and a trip plate for coaction with an element of the trip member to oscillate the same against the tension of the said spring.

31. In a machine of the class described, a work support, a cutting element mounted for movement across the support, means for actuating the cutting element, and means upon the support for gripping work to be acted upon by the cutting element, the said means including a gripping finger, a shiftable bar to which the finger is connected, and means for automatically shifting the bar to move the finger into and out of active position in timed relation to the actuation of the cutting element.

32. In a machine of the class described, a work support, a cutting element movable across the support, means for actuating the cutting element, work gripping elements located at the opposite ends of the path of travel of the cutting element, a trip member with which one of the gripping elements is connected, a trip member with which the other gripping element is connected, coacting means upon the trip members for actuating one of said members to move its respective gripping element to inactive position when the other trip member is similarly actuated, means for automatically actuating the last-mentioned trip member in timed relation to the actuation of the cutting element, and means tending to actuate each of said trip members to move the respective gripping elements into active position.

33. In a machine of the class described, a work support, a cutting element movable across the support, means for actuating the cutting element, work gripping elements located at the opposite ends of the path of travel of the cutting element, a trip member with which one of the gripping elements is connected, a trip member with which the other gripping element is connected, coacting means upon the trip members for connecting the members for movement in unison when actuated to move the respective gripping elements to inactive position, means tending to actuate each of said trip members independently to move the respective gripping elements into active position, and means for actuating and releasing one of the said trip members in timed relation to the actuation of the cutting element.

34. In a machine of the class described, a work support, a cutting element movable across the support, means for actuating the cutting element, work gripping elements located at the opposite ends of the path of travel of the cutting element, a trip member with which one of the gripping elements is connected, a trip member with which the other gripping element is connected, means tending to actuate each of said trip members independently to move the respective gripping elements into active position, means for actuating one of said trip members in opposition to the last-mentioned means, coacting means upon the trip members for simultaneously correspondingly actuating the other trip member, and means for restraining the movement of the last-mentioned trip member under the influence of the means tending to actuate the member to move its respective gripping elements into active position, subsequent to release of the first-mentioned trip member.

35. In a machine of the class described, a rotary cylinder, means for rotating the cylinder, a cutting element movable at an angle across the cylinder, means for actuating the cutting element, work gripping elements located at the opposite ends of the path of travel of the cutting element, a trip member with which one of the gripping elements is connected, a trip member with which the other gripping element is connected, coacting abutment elements upon the trip members arranged to actuate one of said members to move its respective gripping element to inactive position when the other trip member is similarly actuated, the said trip members having engaging elements, and a trip plate located in the path of travel of the engaging elements of the trip members.

36. In a machine of the class described, a rotary cylinder, means for rotating the cylinder, a cutting element movable at an angle across the cylinder, means for actuating the cutting element, work gripping elements located at the opposite ends of the path of travel of the cutting element, a trip member with which one of the gripping elements is connected, a trip member with which the other gripping element is connected, coacting abutment elements upon the trip members arranged to actuate one of said members to move its respective gripping element to inactive position when the other trip member is similarly actuated, the said trip members having engaging elements, and a trip plate located in the path of travel of the engaging elements of the trip members, the said engaging elements of the trip members being designed to successively engage and disengage from the said trip plate.

37. In a machine of the class described, a rotary cylinder, means for rotating the cylinder, a cutting element movable at an angle across the cylinder, means for actuating the cutting element, work gripping elements located at the opposite ends of the path of travel of the cutting element, a trip member with which one of the gripping elements is connected, a trip member with which the other gripping element is connected, coacting abutment elements upon the trip members arranged to actuate one of said members to move its respective gripping element to inactive position when the other trip member is similarly actuated, the said trip members having engaging elements, and a trip plate located in the path of travel of the engaging elements of the trip members, the said engaging elements of the trip members being designed to successively engage and disengage from the said trip plate, and a spring connected with each of said trip members tending to actuate each of said trip members independently to move the respective gripping elements to active position.

38. In a machine of the class described, a work support, a cutting element mounted for travel across the support, means for actuating the cutting element, a gripping element movable into and out of position to grip the work to be acted upon by the cutting element and in timed relation to the actuation of the cutting element, a work piercing point upon the support in juxtaposition to the gripping element, and means for automatically disengaging the work from said piercing point when the gripping element is moved to inactive position.

39. In a machine of the class described, a work support, a cutting element movable across the said support, means for actuating the cutting element, a work piercing point upon the support, a gripping element movable into and out of active position to engage the work to be acted upon by the cutting element, means for actuating the gripping element in timed relation to the actuation of the cutting element, the gripping element being arranged in its movement to active position to force the work down upon the piercing point, and means for automatically disengaging the work from the piercing point when the gripping element is moved to inactive position.

40. In a machine of the class described, a work support, a cutting element movable across the said support, means for actuating the cutting element, a work piercing point upon the support, a gripping element movable into and out of active position to engage the work to be acted upon by the cutting element, means for actuating the gripping element in timed relation to the actuation of the cutting element, the gripping element being arranged in its movement to active position to force the work down upon the piercing point, and a leaf spring upon the support having an end located in juxtaposition to the piercing point and normally sprung outwardly from the support and arranged to disengage the work from the piercing point upon movement of the gripping element to inactive position.

41. In a machine of the class described, a rotary cylinder, means for rotating the cylinder, a cutting element arranged for travel across the cylinder to act upon work fed to the cylinder, and a member mounted upon the cylinder and adjustable with relation thereto whereby to circumferentially increase or diminish the size of the cylinder.

42. In a machine of the class described, a rotary cylinder, means for rotating the cylinder, cutting elements movable across the cylinder and circumferentially spaced with relation to each other, means for actuating the said elements, a plate disposed upon the wall of the cylinder between the said cutting elements and arranged for the passage thereover of work to be acted upon by the cutting elements, and means for flexing the said plate whereby to increase and diminish the diameter of the cylinder.

43. In a machine of the class described, a rotary cylinder, means for rotating the cylinder, the wall of the cylinder having a knife slot therein, a rotary shaft extending into the cylinder, a knife having a blade extending through the slot, operative connection between the shaft and knife for reciprocating the latter, and means for longitudinally feeding the shaft to cause travel of the knife in the knife slot.

44. In a machine of the class described, a rotary cylinder, means for rotating the cylinder, the wall of the cylinder having a knife slot therein, a rotary shaft extending into the cylinder, a knife having a blade extending through the slot, operative connection between the shaft and knife for reciprocating the latter, and means for causing travel of the knife in the knife slot.

45. In a machine of the class described, a rotary cylinder, means for rotating the cylinder, the wall of the cylinder having a knife slot therein, a rotary shaft extending into the cylinder, a knife having a blade extending through the slot, operative connection between the shaft and knife for reciprocating the latter, and means for successively longitudinally feeding the shaft in opposite directions to cause back and forth travel of the knife in the knife slot.

46. In a machine of the class described, a rotary cylinder, means for rotating the cylinder, the wall of the cylinder having a knife slot therein, work gripping means upon the cylinder, a rotary shaft extending into the cylinder, a knife having a blade extending through the slot, operative connection between the shaft and knife for reciprocating the latter, means for longitudinally feeding the shaft to cause travel of the knife in the knife slot, and means for actuating the work gripping means in timed relation to the feed of the shaft.

47. In a machine of the class described, a rotary cylinder, means for rotating the cylinder, the wall of the cylinder having a knife slot therein, work gripping means upon the cylinder, a rotary shaft extending into the cylinder, a knife having a blade extending through the slot, operative connection between the shaft and knife for reciprocating the latter, means for successively longitudinally feeding the shaft in opposite directions to cause back and forth travel of the knife in the knife slot, and means for actuating the gripping means to render the same active and inactive in timed relation to the back and forth travel of the knife.

48. In a machine of the class described, a rotary cylinder, means for rotating the cylinder, the wall of the cylinder having a knife slot therein, a rotary shaft extending into the cylinder, a knife race supported for angular movement about the shaft, a knife having a head working in said race and having a blade extending through the slot in the cylinder, and means upon the shaft coacting with the knife for reciprocating the latter in its race.

49. In a machine of the class described, a rotary cylinder, means for rotating the cylinder, the wall of the cylinder having a knife slot therein, a rotary shaft extending into the cylinder, a knife race supported for angular movement about the shaft, a knife having a head working in said race and having a blade extending through the slot in the cylinder, and means upon the shaft coacting with the knife for reciprocating the latter in its race, and means for longitudinally feeding the shaft to cause travel of the knife in the knife slot.

50. In a machine of the class described, a rotary cylinder, means for rotating the cylinder, the wall of the cylinder having a knife slot therein, a rotary shaft extending into the cylinder, the said slot having branches, knife races disposed for independent angular adjustment about the shaft, knives having heads mounted for reciprocation in the respective races and having blades extending through the slot and working therein and in its branches, and means actuated by the shaft for imparting reciprocatory motion to the knife heads in their respective races.

51. In a machine of the class described, a rotary cylinder, means for rotating the cylinder, the wall of the cylinder having a knife slot therein, a rotary shaft extending into the cylinder, the said slot having branches, knife races disposed for independent angular adjustment about the shafts, knives having heads mounted for reciprocation in their respective races and having blades extending through the slot and working therein and in its branches, means actuated by the shaft for imparting reciprocatory motion to the knife heads in their respective races, and means for longitudinally feeding the shaft to cause travel of the knives in the knife slot and its branches.

52. In a machine of the class described, a rotary cylinder, means for rotating the cylinder, the wall of the cylinder having a knife slot therein and having branches, a rotary shaft extending into the cylinder, knife races disposed for independent angular adjustment about the shaft, a knife for each race having a head mounted for reciprocation in its respective race and having a blade extending through the knife slot and arranged to work therein and the said blades being arranged to work in respective branches of the slot, eccentric elements upon the shaft, and operative connection between each of the elements and the head of the respective knife whereby reciprocatory motion will be imparted to the knives upon the rotation of the shaft.

53. In a machine of the class described, a rotary cylinder, means for rotating the cylinder, the wall of the cylinder having a knife slot therein and having branches, a rotary shaft extending into the cylinder, knife races disposed for independent angular adjustment about the shaft, a knife for each race having a head mounted for reciprocation in its respective race and having a blade extending through the knife slot and arranged to work therein and the said blades being arranged to work in respective branches of the slot, eccentric elements upon the shaft, operative connection between each of the elements and the head of the respective knife whereby reciprocatory motion will be imparted to the knives upon the rotation of the shaft, and means for longitudinally feeding the shaft to cause travel of the knives in the knife slots.

54. In a machine of the class described, a rotary cylinder, means for rotating the cylinder, the wall of the cylinder having a knife slot therein, a rotary shaft extending into the cylinder, an eccentric fixed upon the shaft and having a hub portion, a knife race having a saddle head disposed against and held to the said hub portion of the eccentric, a knife having a head fitted for reciprocatory motion in the race and having a blade extending from its head and through the knife slot in the cylinder, the eccentric having a ball race, the knife race having a ball race slot, and the knife head having a neck provided with a ball socket, and a ball disposed within the races and seating in the said socket.

55. In a machine of the class described, a rotary cylinder, means for rotating the cylinder, the wall of the cylinder having a knife slot therein, a rotary shaft extending into the cylinder, an eccentric fixed upon the shaft and having a hub portion, a knife race having a saddle head disposed against and held to the said hub portion of the eccentric, a knife having a head fitted for reciprocatory motion in the race and having a blade extending from its head and through the knife slot in the cylinder, the eccentric having a ball race, the knife race having a ball race slot, the knife head having a neck provided with a ball socket, a ball disposed within the races and seating in the said socket, and means for longitudinally feeding the shaft to cause travel of the knife in the knife slot.

56. In a machine of the class described, a rotary cylinder, means for rotating the cylinder, the wall of the cylinder having a knife slot therein, a rotary shaft extending into the cylinder, an eccentric fixed upon the shaft and having a hub portion, a knife race having a saddle head disposed against and held to the said hub portion of the eccentric, a knife having a head fitted for reciprocatory motion in the race and having a blade extending from its head and through the knife slot in the cylinder, the eccentric having a ball race, the knife race having a ball race slot, and the knife head having a neck provided with a ball socket, a ball disposed within the races and seating in the said socket, the knife head being rotatable within the knife race and the said neck of the knife head being cut-away at one side whereby when the head is rotated to one position the cut-away side of its neck will be presented next to the ball whereby to clear the said ball and permit of the head being withdrawn from the knife race.

57. In a machine of the class described, a rotary cylinder, means for rotating the cylinder, the wall of the cylinder having a knife slot therein, a rotary shaft extending into the cylinder, an eccentric fixed upon the shaft and having a hub portion, a knife race having a saddle head disposed against and held to the said hub portion of the eccentric, a knife having a head fitted for reciprocatory motion in the race and having a blade extending from its head and through the knife slot in the cylinder, the eccentric having a ball race, the knife race having a ball race slot, and the knife head having a neck provided with a ball socket, and the knife head being rotatable within the knife race and the said neck of the knife head being cut-away at one side whereby when the head is rotated to one position the cut-away side of its neck will be presented next to the ball whereby to clear the said ball and permit of the head being withdrawn from the knife race, the ball race slot in the knife race being of a width less than the diameter of the ball whereby the ball will be retained within said race and the race in the eccentric subsequent to withdrawal of the knife head from the knife race.

58. In a machine of the class described, cutting mechanism including a rotary shaft, an eccentric fixed thereon, a knife race having one side formed with a ball race slot and disposed against one face of the eccentric, a knife having a head mounted for reciprocatory motion in the race and having a ball socket located opposite the slot, the face of the eccentric having an annular groove formed therein, a ball race ring removably fitted in said groove, and a ball element seated in the said races and engaging in the socket.

59. In a machine of the class described, cutting mechanism including a rotary shaft, an eccentric fixed thereon, a knife race having one side formed with a ball race slot and disposed against one face of the eccentric, a knife having a head mounted for reciprocatory motion in the race and having a ball socket located opposite the slot, the face of the eccentric having an annular groove formed therein, a ball race ring disposed within the groove, means securing the ring in place whereby it may be released and rotatably adjusted to present a new wearing surface and then again secured in place, and a ball seated in the said races and engaging in the socket.

60. In a machine of the class described, a rotary cylinder, means for rotating the cylinder, the wall of the cylinder having a knife slot therein, a rotary shaft extending into the cylinder, knife races arranged side by side and independently angularly adjustable with relation to the shaft and provided at their inner ends with saddle portions facing the shaft, the opposing sides of the races being formed with registering annular grooves concentric to the shaft, a locking ring disposed between the races with its edge portions extending into the grooves whereby to hold the said races against outward displacement with relation to the shaft, knives having heads working in respective ones of the races and having blades extending through the knife slot, and operative connection between the shaft and the knife heads for reciprocating the latter upon rotation of the shaft.

61. In a machine of the class described, a rotary cylinder, means for rotating the cylinder, the wall of the cylinder having a knife slot therein, a rotary shaft extending into the cylinder, a knife race positioned radially to the shaft, a knife having a head mounted for reciprocatory motion in the race and having a blade extending into the slot in the cylinder wall, operative connection between the knife head and the shaft for imparting reciprocatory motion to the knife head, a thimble rotatably fitted upon the outer end of the knife race and having a guide coacting with the blade of the knife to hold the knife and thimble for turning movement in unison, and coacting means upon the thimble and the wall of the cylinder for rotatably adjusting the thimble to guide the knife in said slot.

62. In a machine of the class described, a rotary cylinder, means for rotating the cylinder, the wall of the cylinder having a knife slot therein, a rotary shaft extending into the cylinder, a knife race positioned radially to the shaft, a knife having a head mounted for reciprocatory motion in the race and having a blade extending into the slot in the cylinder wall, operative connection between the knife head and the shaft for imparting reciprocatory motion to the knife head, a member rotatably mounted upon the knife race, and engaging the blade of the knife for turning movement in unison therewith, and coacting means upon the said member and the cylinder wall for rotatably adjusting the member to guide the knife in its passage through the knife slot.

63. In a machine of the class described, a rotary cylinder, means for rotating the cylinder, the wall of the cylinder having a knife slot therein, a rotary shaft extending into the cylinder, a knife race positioned radially to the shaft, a knife having a head mounted for reciprocatory motion in the race and having a blade extending into the slot in the cylinder wall, operative connection between the knife head and the shaft for imparting reciprocatory motion to the knife head, a thimble rotatably mounted upon the knife race and having a slot for the passage of the knife blade, the thimble having a guideway and a flange upon the wall of the cylinder extending beside the slot and engaging in the said guideway of the thimble.

64. In a machine of the class described, a rotary cylinder, means for rotating the cylinder, the wall of the cylinder having a knife slot therein, a rotary shaft extending into the cylinder, a knife race positioned radially to the shaft, a knife having a head mounted for reciprocatory motion in the race and having a blade extending into the slot in the cylinder wall, operative connection between the knife head and the shaft for imparting reciprocatory motion to the knife head, a thimble rotatably fitted upon the outer end of the knife race and having a guide coacting with the blade of the knife to hold the knife and thimble for turning movement in unison, coacting means upon the thimble and the wall of the cylinder for rotatably adjusting the thimble to guide the knife in said slot, and means for longitudinally feeding the shaft to cause travel of the knife in the knife slot.

65. In a machine of the class described, a rotary cylinder, means for rotating the cylinder, the wall of the cylinder having a knife slot therein, a rotary shaft extending into the cylinder, a knife race positioned radially to the slot, a knife having a head mounted for reciprocatory motion in the race and having a blade extending into the slot in the cylinder wall, operative connection between the knife head and the shaft for imparting reciprocatory motion to the knife head, a member rotatably mounted upon the knife race and engaging the blade of the knife for turning movement in unison therewith, coacting means upon the said member and the cylinder wall for rotatably adjusting the member to guide the knife in its passage through the knife slot, and means for longitudinally feeding the shaft.

66. In a machine of the class described, a rotary cylinder, means for rotating the cylinder, the wall of the cylinder having a knife slot therein, a rotary shaft extending into the cylinder, a knife race positioned radially to the shaft, a knife having a head mounted for reciprocatory motion in the race and having a blade extending into the slot in the cylinder wall, operative connection between the knife head and the shaft for imparting reciprocatory motion to the knife head, a thimble rotatably mounted upon the knife race and having a slot for the passage of the knife blade, the thimble having a guideway, a flange upon the wall of the cylinder extending beside the slot and engaging in the said guideway of the thimble, and means for longitudinally feeding the shaft.

67. In a machine of the class described, a rotary cylinder, means for rotating the cylinder, the wall of the cylinder having a knife slot therein, a rotary shaft extending into the cylinder, a knife race positioned radially to the slot, a knife having a head mounted for reciprocatory motion in the race and having a blade extending into the slot in the cylinder wall, operative connection between the knife head and the shaft for imparting reciprocatory motion to the knife head, a thimble rotatably fitted upon the outer end of the knife race and having a slot therein for the passage of the blade of the knife, the said thimble being provided in juxtaposition to the slot with a lint opening, and coacting means upon the thimble and the wall of the cylinder for angularly adjusting the thimble to guide the knife in the knife slot in the cylinder.

68. In a machine of the class described, a rotary cylinder, means for rotating the cylinder, the wall of the cylinder having a knife slot therein, a rotary shaft extending into the cylinder, a knife race positioned radially to the slot, a knife having a head mounted for reciprocatory motion in the race and having a blade extending into the slot in the cylinder wall, operative connection between the knife head and the shaft for imparting reciprocatory motion to the knife head, a thimble rotatably fitted upon the outer end of the knife race and having a slot therein for the passage of the blade of the knife, the said thimble being provided in juxtaposition to the slot with a lint opening, coacting means upon the thimble and the wall of the cylinder for angularly adjusting the thimble to guide the knife in the knife slot in the cylinder, and means for longitudinally feeding the shaft.

69. In a machine of the class described, cutting mechanism including a shaft, an eccentric fixed upon the shaft for rotation therewith, a knife race disposed for angular adjustment about the shaft and at one face resting against the face of the eccentric, a knife having a head mounted for reciprocation in the said knife race, operative connection between the eccentric and the knife head for reciprocating the latter, and a lubricating element carried by the knife race and contacting the face of the eccentric.

70. In a knife for a machine of the class described, a knife head formed in one end with a cylindrical socket and with a slot transecting the socket, the socket being of greater depth than the slot, and a blade having its inner end fitted into the slot in the said head and having a tang extending inwardly beyond the slot and into the said socket, and a securing element secured through the head and through the said inner end of the blade.

71. In a machine of the class described, a rotary cylinder, means for rotating the cylinder, the wall of the cylinder having a knife slot therein, a rotary shaft extending into the cylinder, a knife having a blade extending through the slot, operative connection between the shaft and knife for reciprocating the latter, the shaft having a threaded portion, a feed nut mounted upon the cylinder and movable into and out of mesh with the threaded portion of the shaft, and means for moving the feed nut into mesh with the shaft at a predetermined point in the rotation of the cylinder whereby to feed the shaft longitudinally and cause the knife to travel in the knife slot.

72. In a machine of the class described, a rotary cylinder, means for rotating the cylinder, the wall of the cylinder having a knife slot therein, a rotary shaft extending into the cylinder, a knife having a blade extending through the slot, operative connection between the shaft and knife for reciprocating the latter, the shaft having a threaded portion, a feed nut mounted upon the cylinder and movable into and out of mesh with the threaded portion of the shaft, means for moving the feed nut into mesh with the shaft at a predetermined point in the rotation of the cylinder whereby to feed the shaft longitudinally and cause the knife to travel in the knife slot, a fixed cam member, and an element upon the said feed nut arranged for coaction with the cam member through a period of the rotation of the cylinder to move the said nut into mesh with the threaded portion of the shaft whereby to longitudinally feed the shaft and to cause travel of the knife in the knife slot.

73. In a machine of the class described, a rotary cylinder, means for rotating the cylinder, the wall of the cylinder having a knife slot therein, a rotary shaft extending into the cylinder, a knife blade extending through the slot, operative connection between the shaft and knife for reciprocating the latter, the shaft having a threaded portion, a feed nut radially movable upon one head of the cylinder into and out of mesh with the threaded portion of the shaft, and a cam arranged in the path of travel of an element of the said feed nut in the rotation of the cylinder and constituting means for moving and holding the nut in mesh with the shaft through a period of rotation of the cylinder.

74. In a machine of the class described, a rotary cylinder, means for rotating the cylinder, the wall of the cylinder having a knife slot therein, a rotary shaft extending into the cylinder, a knife blade extending through the slot, operative connection between the shaft and knife for reciprocating the latter, the shaft having a threaded portion, a feed nut radially movable upon one head of the cylinder into and out of mesh with the threaded portion of the shaft, a cam member having a cam groove located in the path of movement of an element of the nut in the rotation of the cylinder and formed to coact with the said element to adjust the nut into mesh with the shaft through a period of rotation with the cylinder, and a yieldable spring secured at one end within the groove and having its other end sprung into the groove in position for engagement by the said element upon the nut and to absorb the shock of such engagement.

75. In a machine of the class described, a rotary cylinder having a knife slot therein, a shaft extending into the cylinder, the cylinder having a hub portion through which the shaft extends at one end, a knife extending into the knife slot in the cylinder, operative connection between the shaft and the knife for imparting reciprocatory motion to the knife, the shaft having a threaded portion, a feed nut upon the cylinder, means for moving the feed nut into mesh with the threaded portion of the shaft through a period in the rotation of the cylinder, means for applying power directly to the shaft to rotate the shaft at high speed, and reducing gearing operatively connecting the said shaft and the hub of the cylinder to impart rotary motion to the cylinder at low speed.

76. In a machine of the class described, a rotary cylinder, work gripping and cutting mechanism thereon, and means for tensioning and guiding work gripped by the said gripping means upon the cylinder, the said tensioning and guiding means including an oscillatory member having a bearing portion arranged to engage the material and hold the same against the wall of the cylinder, and means for yieldably holding the member oscillated in a direction to provide for such engagement.

77. In a machine of the class described, a rotary cylinder, work gripping and cutting mechanism thereon, means for tensioning and guiding work gripped by the said gripping means upon the cylinder, the said tensioning and guiding means including an oscillatory member having a bearing portion arranged to engage the material and hold the same against the wall of the cylinder, means for yieldably holding the member oscillated in a direction to provide for such engagement, and a guide arranged rearwardly of the said engaging member and including spaced members between which the work is to pass.

78. In a machine of the class described, a rotary cylinder, work gripping and cutting mechanism thereon, and means for tensioning and guiding work gripped by the said gripping means upon the cylinder, the said tensioning and guiding means including an oscillatory member having a bearing portion arranged to engage the material and hold the same against the wall of the cylinder, means for yieldably holding the member oscillated in a direction to provide for such engagement, a second oscillatory member, a bearing tongue carried thereby and arranged to engage the work and hold the same against the first-mentioned oscillatory member, and operative connection between the oscillatory members whereby the same may be moved in unison to engage or disengage from the work.

In testimony whereof I affix my signature.

FRANK R. EVANS. [L. S.]

Copies of this patent may be obtained for five cents each, by addressing the "Commissioner of Patents, Washington, D. C."